US011911885B2

(12) United States Patent
Watanabe et al.

(10) Patent No.: US 11,911,885 B2
(45) Date of Patent: *Feb. 27, 2024

(54) DRIVING TOOL

(71) Applicant: MAX CO., LTD., Tokyo (JP)

(72) Inventors: Eiichi Watanabe, Tokyo (JP); Takashi Yuki, Tokyo (JP); Yu Yamamoto, Tokyo (JP); Mitsuhiro Kimura, Tokyo (JP)

(73) Assignee: Max Co., Ltd., Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 17/166,043

(22) Filed: Feb. 3, 2021

(65) Prior Publication Data

US 2021/0154818 A1 May 27, 2021

Related U.S. Application Data

(63) Continuation of application No. 16/251,222, filed on Jan. 18, 2019, now Pat. No. 10,940,579.

(30) Foreign Application Priority Data

Jan. 19, 2018 (JP) ................................ 2018-007520
Jan. 19, 2018 (JP) ................................ 2018-007521
(Continued)

(51) Int. Cl.
*B25C 1/08* (2006.01)
*B25D 9/10* (2006.01)
(Continued)

(52) U.S. Cl.
CPC .................. *B25C 1/08* (2013.01); *B25D 9/10* (2013.01); *F02B 63/02* (2013.01); *F01L 9/10* (2021.01)

(58) Field of Classification Search
CPC .... B25C 1/08; B25C 1/14; B25C 1/18; B25D 9/10; F02B 63/02; F01L 9/10
(Continued)

(56) References Cited

U.S. PATENT DOCUMENTS 2,167,983 A * 8/1939 Kiecksee ................ E02D 7/125 173/128
2,543,126 A * 2/1951 Philippovic ............... E02D 7/12 123/47 R
(Continued)

FOREIGN PATENT DOCUMENTS

CN 1502447 A 6/2004
CN 106061684 A 10/2016
(Continued)

OTHER PUBLICATIONS

The Japanese Office Action for application No. 2018-022480 dated Aug. 17, 2021 (3 pages, non-English).
(Continued)

*Primary Examiner* — Robert F Long
(74) *Attorney, Agent, or Firm* — Banner & Witcoff, Ltd.

(57) ABSTRACT

A driving tool includes a striking mechanism configured to be actuated by a combustion pressure of a mixed gas of compressed air and fuel, a combustion chamber in which the mixed gas of compressed air and fuel is to be combusted, a valve member configured to open and close communication between the striking mechanism and the combustion chamber, and a valve support member configured to support the valve member. The valve member has a seal part provided on an outer peripheral surface along a moving direction of the valve member.

8 Claims, 13 Drawing Sheets

(30) Foreign Application Priority Data

| | | | |
|---|---|---|---|
| Jan. 19, 2018 | (JP) | ................................. | 2018-007633 |
| Feb. 9, 2018 | (JP) | ................................. | 2018-022480 |
| Feb. 9, 2018 | (JP) | ................................. | 2018-022481 |
| Feb. 9, 2018 | (JP) | ................................. | 2018-022482 |
| Feb. 19, 2018 | (JP) | ................................. | 2018-026624 |
| Apr. 25, 2018 | (JP) | ................................. | 2018-084498 |
| Apr. 25, 2018 | (JP) | ................................. | 2018-084499 |
| Apr. 25, 2018 | (JP) | ................................. | 2018-084500 |
| Apr. 25, 2018 | (JP) | ................................. | 2018-084501 |

(51) Int. Cl.
*F02B 63/02* (2006.01)
*F01L 9/10* (2021.01)

(58) Field of Classification Search
USPC .......... 173/90, 200–201, 122, 127–128, 133, 173/135–138
See application file for complete search history.

(56) References Cited

U.S. PATENT DOCUMENTS

| | | | | |
|---|---|---|---|---|
| 2,988,072 | A * | 6/1961 | Colton ...................... | F01L 1/28 123/79 C |
| 3,326,194 | A * | 6/1967 | Haller ..................... | F01L 13/00 477/203 |
| 3,381,672 | A * | 5/1968 | Stephen ..................... | B21J 7/26 123/74 R |
| 3,403,600 | A | 10/1968 | Bade | |
| 3,638,534 | A | 2/1972 | Ramspeck | |
| 3,850,359 | A | 11/1974 | Obergfell | |
| 3,967,771 | A | 7/1976 | Smith | |
| 4,075,850 | A | 2/1978 | Nakazato et al. | |
| 4,534,500 | A * | 8/1985 | Jochum ..................... | B25C 1/18 411/440 |
| 4,665,868 | A | 5/1987 | Adams | |
| 4,739,915 | A | 4/1988 | Cotta | |
| 4,759,318 | A | 7/1988 | Adams | |
| 4,770,254 | A | 9/1988 | Kominami | |
| 5,191,861 | A | 3/1993 | Kellerman et al. | |
| 5,363,999 | A | 11/1994 | Braun | |
| 5,370,295 | A | 12/1994 | Simonelli | |
| 5,595,148 | A * | 1/1997 | Letsche ..................... | F01L 9/10 91/356 |
| 5,722,600 | A * | 3/1998 | Horiuchi .............. | F02M 55/008 239/533.8 |
| 5,873,508 | A | 2/1999 | MacVicar et al. | |
| 6,123,158 | A | 9/2000 | Steffan | |
| 6,237,827 | B1 | 5/2001 | Reckelhoff | |
| 6,247,626 | B1 | 6/2001 | MacVicar | |
| 6,378,288 | B1 | 4/2002 | Towfighi et al. | |
| 6,722,550 | B1 | 4/2004 | Ricordi et al. | |
| 6,736,090 | B1 * | 5/2004 | Ichikawa .................. | F01L 7/04 123/188.5 |
| 6,837,415 | B1 | 1/2005 | Haung | |
| 7,424,870 | B2 | 9/2008 | Odoni et al. | |
| 7,918,373 | B2 | 4/2011 | Ohmori | |
| 10,557,738 | B2 * | 2/2020 | Rigdon .............. | F02M 63/0078 |
| 2002/0062796 | A1 | 5/2002 | Thieleke et al. | |
| 2003/0127238 | A1 | 7/2003 | Largo | |
| 2004/0026476 | A1 | 2/2004 | Shima et al. | |
| 2004/0079302 | A1 | 4/2004 | Wolf et al. | |
| 2004/0134961 | A1 | 7/2004 | Wolf et al. | |
| 2004/0144357 | A1 | 7/2004 | Adams | |
| 2004/0149801 | A1 | 8/2004 | Hirtl et al. | |
| 2004/0182336 | A1 | 9/2004 | Ohmori et al. | |
| 2004/0182909 | A1 * | 9/2004 | Lund ....................... | F02B 43/10 227/10 |
| 2005/0029323 | A1 | 2/2005 | Shima et al. | |
| 2006/0065691 | A1 | 3/2006 | Shima et al. | |
| 2006/0185113 | A1 | 8/2006 | Kloeppel et al. | |
| 2006/0254543 | A1 * | 11/2006 | Sun .......................... | F01L 9/10 123/90.12 |
| 2006/0260568 | A1 | 11/2006 | Moeller et al. | |
| 2006/0283909 | A1 | 12/2006 | Shima et al. | |
| 2007/0034395 | A1 | 2/2007 | Glaser et al. | |
| 2007/0059186 | A1 | 3/2007 | Weaver et al. | |
| 2007/0210132 | A1 | 9/2007 | Akiba | |
| 2007/0240683 | A1 | 10/2007 | Zahner et al. | |
| 2008/0237295 | A1 | 10/2008 | Adams | |
| 2008/0251558 | A1 | 10/2008 | Suda | |
| 2008/0251562 | A1 | 10/2008 | Liesse | |
| 2008/0314952 | A1 | 12/2008 | Tamura et al. | |
| 2009/0250499 | A1 | 10/2009 | Hahn et al. | |
| 2010/0108736 | A1 | 5/2010 | Tanaka | |
| 2010/0176177 | A1 | 7/2010 | Tanaka | |
| 2010/0230461 | A1 | 9/2010 | Tanaka | |
| 2010/0327039 | A1 | 12/2010 | Adams | |
| 2011/0005502 | A1 * | 1/2011 | Adams ...................... | B25C 1/08 123/559.1 |
| 2011/0073336 | A1 | 3/2011 | Baba et al. | |
| 2011/0108600 | A1 | 5/2011 | Pedicini et al. | |
| 2011/0240709 | A1 | 10/2011 | Oouchi | |
| 2012/0132690 | A1 | 5/2012 | Dittrich et al. | |
| 2012/0153003 | A1 | 6/2012 | Dittrich | |
| 2012/0211539 | A1 | 8/2012 | Kosuge | |
| 2013/0082083 | A1 | 4/2013 | Largo | |
| 2013/0082085 | A1 | 4/2013 | Largo | |
| 2013/0134204 | A1 | 5/2013 | Morioka et al. | |
| 2013/0270319 | A1 | 10/2013 | Gauger et al. | |
| 2014/0069981 | A1 | 3/2014 | Ricordi et al. | |
| 2015/0343625 | A1 * | 12/2015 | Ricordi ................... | F02B 71/04 173/209 |
| 2015/0369118 | A1 | 12/2015 | Adams | |
| 2016/0144496 | A1 | 5/2016 | Raggl et al. | |
| 2016/0303724 | A1 | 10/2016 | Dittrich et al. | |
| 2016/0325419 | A1 | 11/2016 | Sperrfechter et al. | |
| 2016/0354908 | A1 * | 12/2016 | Wong ........................ | B25C 1/08 |
| 2018/0222030 | A1 * | 8/2018 | Zhao ....................... | B25C 1/047 |
| 2019/0001474 | A1 | 1/2019 | Schmidt et al. | |
| 2019/0224827 | A1 * | 7/2019 | Yamamoto ............... | B25D 9/10 |
| 2020/0276692 | A1 | 9/2020 | Wolf et al. | |

FOREIGN PATENT DOCUMENTS

| | | | | | |
|---|---|---|---|---|---|
| GB | 1 499 587 | A | | 2/1978 | |
| GB | 1499587 | A | * | 2/1978 | ............... B25C 1/08 |
| GB | 2060768 | A | * | 5/1981 | ............... B25C 1/08 |
| JP | 50-15177 | | | 2/1975 | |
| JP | 51-58768 | | | 5/1976 | |
| JP | 52-138479 | U | | 10/1977 | |
| JP | 52129075 | A | | 10/1977 | |
| JP | S53-004384 | U | | 1/1978 | |
| JP | S62-124883 | A | | 6/1987 | |
| JP | 63-028573 | A | | 2/1988 | |
| JP | 63-28574 | A | | 2/1988 | |
| JP | 63-109986 | A | | 5/1988 | |
| JP | H07-164349 | A | | 6/1995 | |
| JP | 2000-158361 | A | | 6/2000 | |
| JP | 2000-515435 | A | | 11/2000 | |
| JP | 2001-260049 | A | | 9/2001 | |
| JP | 2004-314263 | A | | 11/2001 | |
| JP | 20020113671 | A | | 4/2002 | |
| JP | 2004-034288 | A | | 2/2004 | |
| JP | 2004-074296 | A | | 3/2004 | |
| JP | 2004-299043 | A | | 10/2004 | |
| JP | 2004-333120 | A | | 11/2004 | |
| JP | 2005-219193 | A | | 8/2005 | |
| JP | 2006000956 | A | * | 1/2006 | ............... B25C 1/08 |
| JP | 2006000956 | A | | 1/2006 | |
| JP | 2007-237328 | A | | 9/2007 | |
| JP | 2008-255813 | A | | 10/2008 | |
| JP | 2008-260100 | A | | 10/2008 | |
| JP | 2009-45676 | A | | 3/2009 | |
| JP | 2011-073110 | A | | 4/2011 | |
| JP | 4935978 | B2 | | 5/2012 | |
| JP | 2012-125919 | A | | 7/2012 | |
| JP | 2012-171055 | A | | 9/2012 | |
| JP | 2012-210704 | A | | 11/2012 | |
| JP | 2013-166198 | A | | 8/2013 | |
| JP | 2014-233786 | A | | 12/2014 | |
| JP | 2016-525454 | A | | 8/2016 | |

(56) References Cited

FOREIGN PATENT DOCUMENTS

| | | | |
|---|---|---|---|
| JP | 2016-538146 | | 12/2016 |
| TW | 200736015 | A | 10/2007 |
| TW | 201722644 | A | 7/2017 |
| WO | 2007/048006 | A2 | 4/2007 |
| WO | 2008/118838 | A1 | 10/2008 |
| WO | 2009-051195 | A1 | 4/2009 |

OTHER PUBLICATIONS

The Japanese Office Action for application No. 2018-022481 dated Aug. 17, 2021 (4 pages, non-English).
The Japanese Office Action for application No. 2018-022482 dated Aug. 17, 2021 (6 pages, non-Engish).
The Japanese Office Action for application No. 2018-026624 dated Aug. 31, 2021 (5 pages, non-English).
A JP Office Action for JP Appl. No. 2018-007521 dated Aug. 24, 2021 (4 pages, non-English).
A JP Office Action for JP Appl. No. 2018-007633 dated Aug. 24, 2021 (5 pages, non-English).
JP Office Action for JP Appl. No. 2018-084499 dated Oct. 5, 2021 (4 pages, non-English).
JP Office Action for JP Appl. No. 2018-084498 dated Aug. 24, 2021 (4 pages, non-English).
Chinese Office Action for Chinese Application No. 201910047487.1 dated May 31, 2022. (8 pp.).
Office Action issued in corresponding Taiwanese Application No. 108101978 dated Jul. 6, 2021, 10 pages.
European Search Report issued in Application No. 19152478.4, dated Nov. 5, 2019, 9 pages.
Japanese Office Action for corresponding JP Office Action No. 2018-007520 dated Aug. 3, 2021. (4 pp).

* cited by examiner

DRIVING TOOL

CROSS-REFERENCE TO RELATED APPLICATION

This application is a continuation of U.S. patent application Ser. No. 16/251,222, filed on Jan. 18, 2019, which claims priorities from Japanese patent applications No. 2018-007520 filed on Jan. 19, 2018, No. 2018-007521 filed on Jan. 19, 2018, No. 2018-007633 filed on Jan. 19, 2018, No. 2018-022480 filed on Feb. 9, 2018, No. 2018-022481 filed on Feb. 9, 2018, No. 2018-022482 filed on Feb. 9, 2018, No. 2018-026624 filed on Feb. 19, 2018, No. 2018-084498 filed on Apr. 25, 2018, No. 2018-084499 filed on Apr. 25, 2018, No. 2018-084500 filed on Apr. 25, 2018, and No. 2018-084501 filed on Apr. 25, 2018, the entire contents of which are incorporated herein by reference.

TECHNICAL FIELD

The present disclosure relates to a driving tool configured to combust a mixed gas of air and fuel and to be driven by a combustion pressure.

BACKGROUND

A driving tool referred to as a nailing machine configured to strike a fastener such as a nail by actuating a piston with a striking cylinder by using a compressed air as a power source and driving a driver joined to the piston has been known. In the driving tool, a valve referred to as a head valve is configured so that the compressed air is to be supplied from a side of the striking cylinder.

Also, a driving tool referred to as a nailing machine configured to strike a fastener such as a nail by combusting a mixed gas of air and fuel and actuating a striking cylinder by a combustion pressure has been known. In the gas combustion type driving tool, the mixed gas of which a pressure has been increased in advance is combusted to further increase the combustion pressure. However, since the mixed gas of which a pressure has been increased is generated, when the compressed air is supplied to a combustion chamber, the striking cylinder is actuated by a pressure of the compressed air before the mixed gas is combusted.

Therefore, a driving tool including a valve configured to openably/closably partition a combustion chamber in which a mixed gas of compressed air and fuel is to be combusted and a striking cylinder has been suggested (for example, refer to Patent Document 1).

Patent Document 1: Japanese Patent No. 4,935,978B

In the related art, the same configuration as the driving tool in which the compressed air is used as a power source is used for the valve configured to openably/closably partition the combustion chamber and the striking cylinder, and the high temperature and high pressure combusted gas is supplied to the valve from a side of the striking cylinder.

In the above configuration, a seal material is provided on an end face of the valve in a moving direction. However, in a state where the valve is opened, the seal material is exposed to a flow path of the gas. Since the gas which is obtained as a result of the combustion of the mixed gas of compressed air and fuel is at the high temperature and high pressure, when the seal material is exposed to the flow path of the gas, the durability of the seal material is deteriorated due to an influence of heat. Also, a spring configured to urge the valve in a closing direction is provided. However, in the configuration where the high temperature and high pressure combusted gas is supplied from a side of the striking cylinder, a diameter of the spring increases, which in turn increases a size of a main body.

SUMMARY

The present disclosure has been made in view of the above situations, and an object thereof is to provide a driving tool capable of improving durability of a seal part and suppressing a size of a main body from increasing.

One aspect of the present disclosure is a driving tool comprising: a striking mechanism configured to be actuated by a combustion pressure of a mixed gas of compressed air and fuel; a combustion chamber in which the mixed gas of compressed air and fuel is to be combusted; a valve member configured to open and close communication between the striking mechanism and the combustion chamber; and a valve support member configured to support the valve member, wherein the valve member has a seal part provided on an outer peripheral surface along a moving direction of the valve member.

According to the present disclosure, the seal part is provided on the outer periphery of the valve member configured to open and close communication between the striking mechanism and the combustion chamber, so that the seal part is suppressed from being exposed to a gas obtained as a result of combustion of a mixed gas of compressed air and fuel.

One aspect of the present disclosure is a driving tool comprising: a striking mechanism configured to be actuated by a combustion pressure of a mixed gas of compressed air and fuel; a combustion chamber in which the mixed gas of compressed air and fuel is to be combusted; a valve member configured to open and close communication between the striking mechanism and the combustion chamber; and a valve support member configured to support the valve member, wherein an urging member configured to urge the valve member is provided on an axis of the striking mechanism.

According to the present disclosure, the urging member configured to urge the valve member is provided on the axis of the striking mechanism, so that the urging member can be made small.

According to the present disclosure, the mixed gas of compressed air and fuel is combusted, the striking mechanism is actuated by the combustion pressure, and the durability of the seal part can be improved. Also, it is possible to make the urging member small, thereby suppressing a size of the main body from increasing.

DETAILED DESCRIPTION

Hereinafter, an embodiment of a nailing machine, which is an example of the driving tool of the present disclosure, will be described with reference to the drawings.

Configuration Example of Nailing Machine of Embodiment

Figure 1:
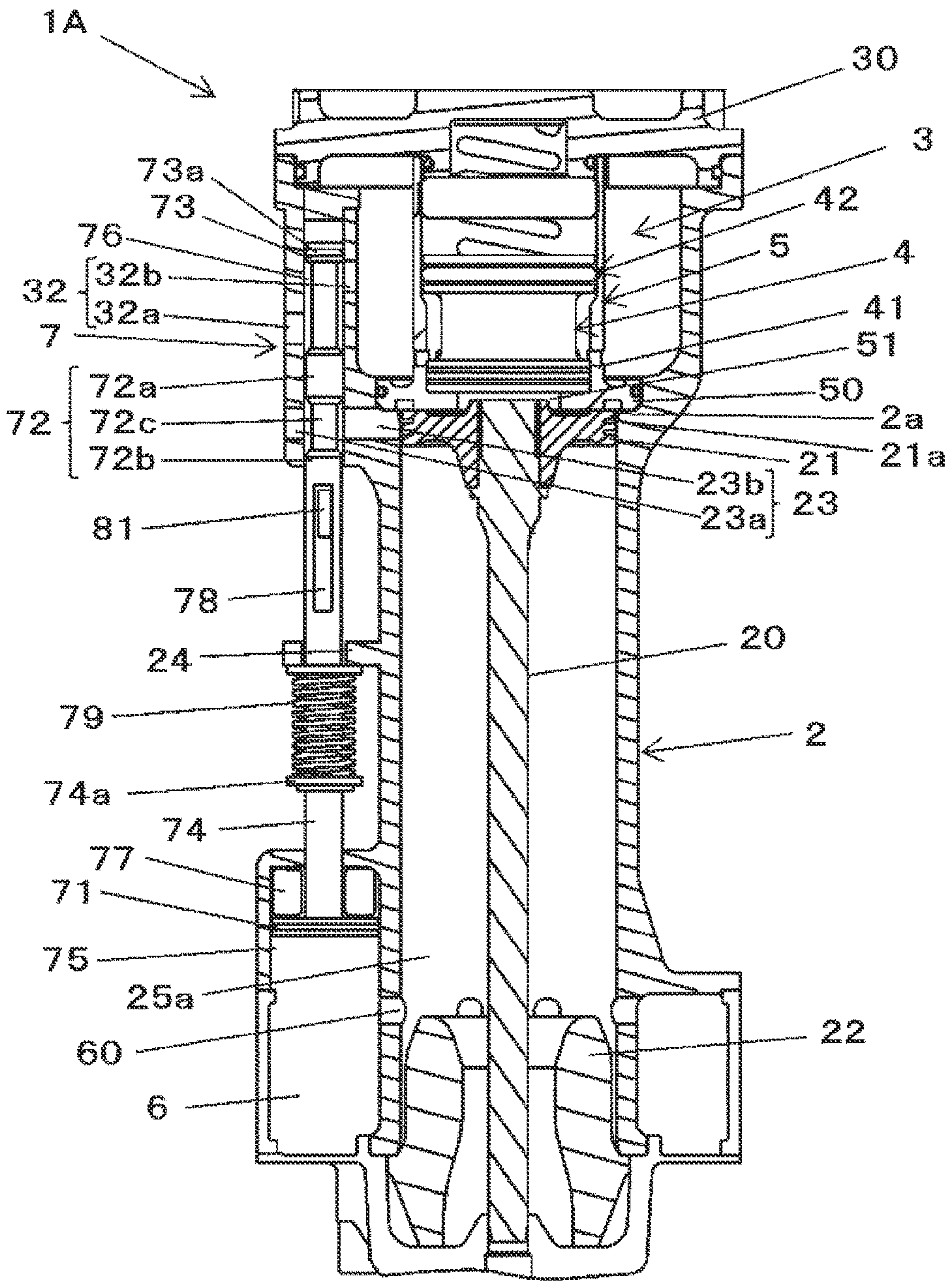
FIG. 1 is a configuration view of main parts depicting an example of a nailing machine of an embodiment.
Figure 2:
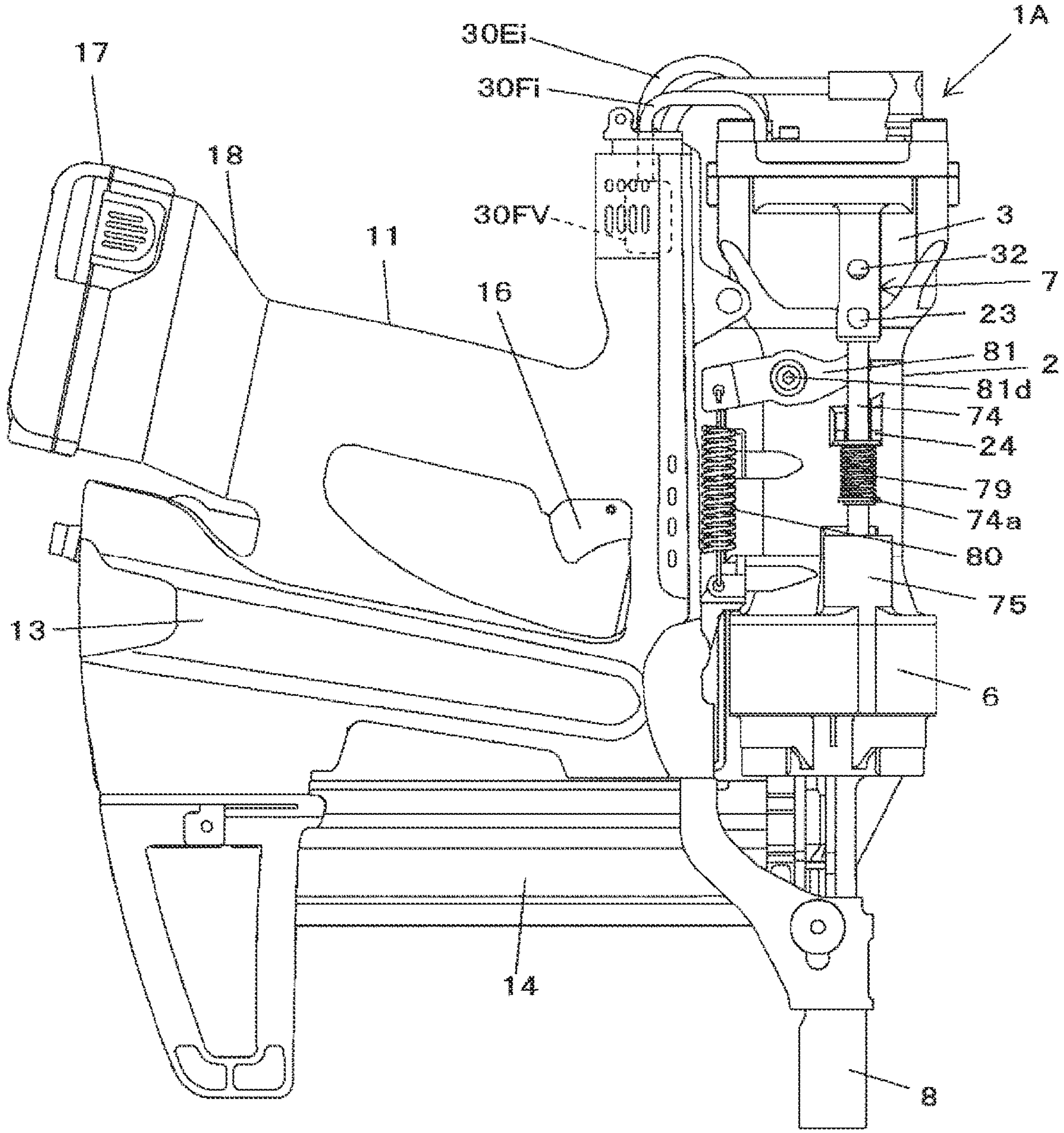
FIG. 2 is an overall configuration view depicting an example of the nailing machine of the embodiment.
Figure 3:
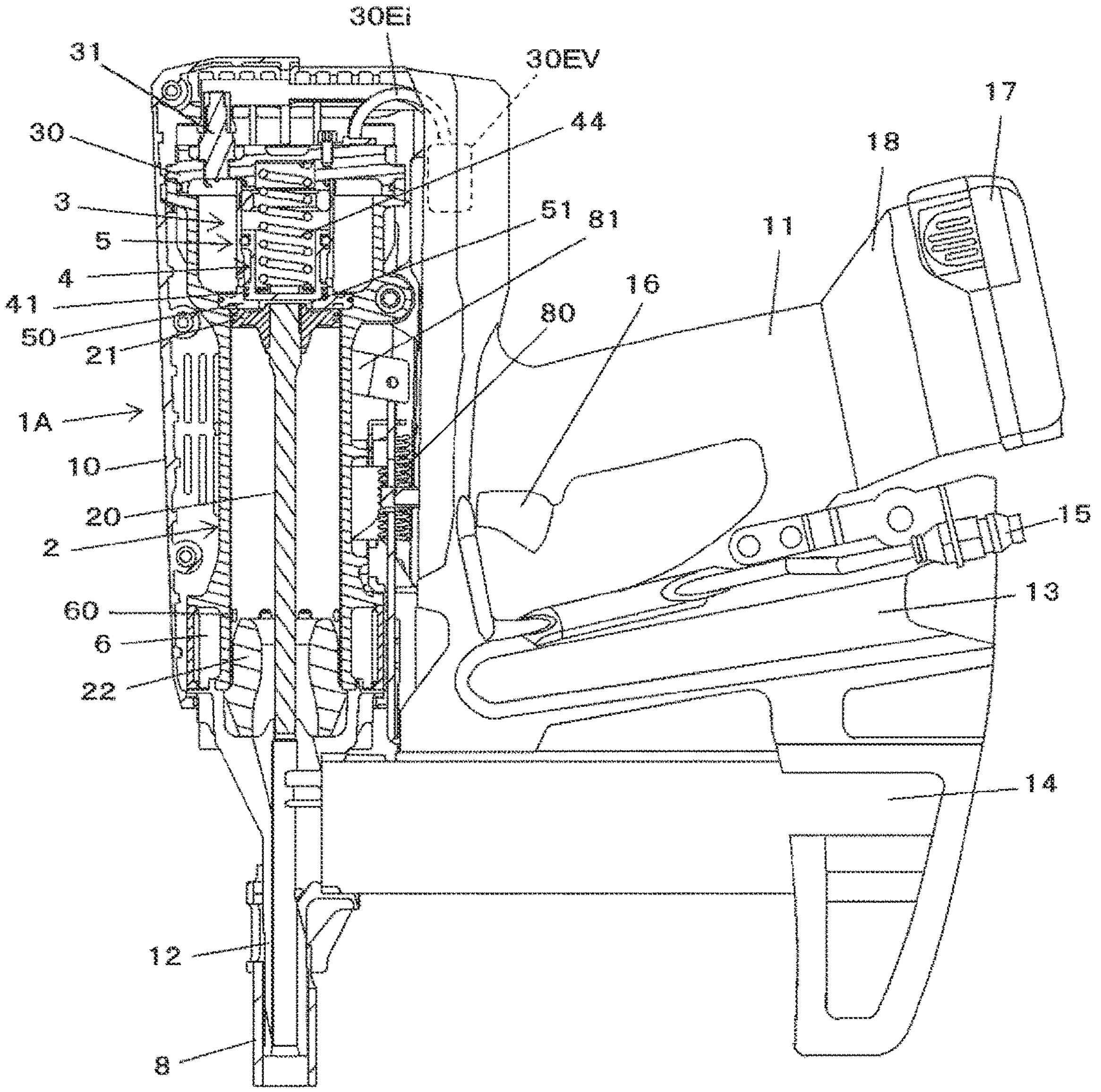
FIG. 3 is an overall configuration view depicting an example of the nailing machine of the embodiment.
Figure 4:
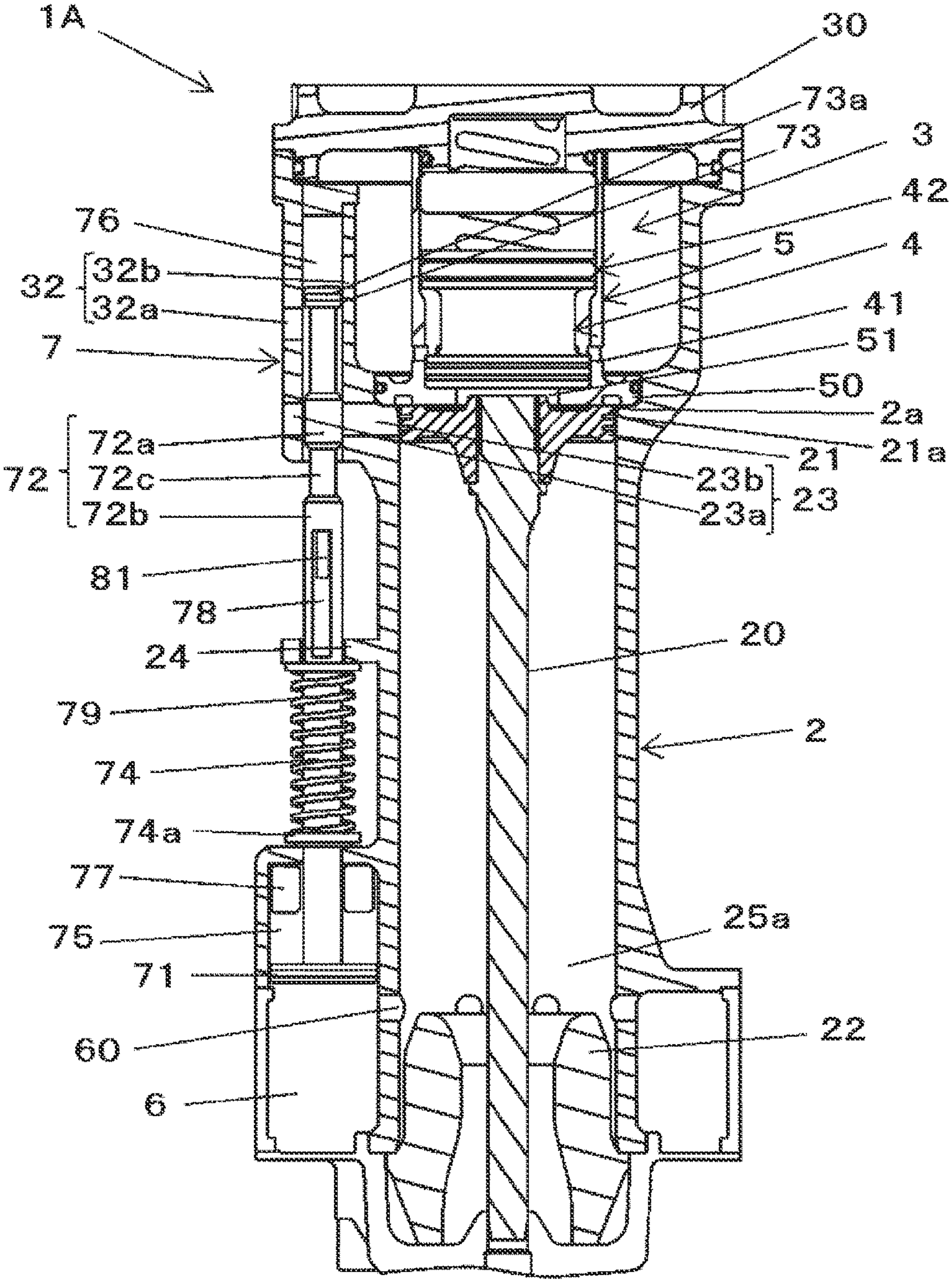
FIG. 4 is a configuration view of main parts depicting an example of the nailing machine of the embodiment and an operation example.

FIG. 1 is an overall view depicting an example of a nailing machine of an embodiment, and FIGS. 2 and 3 are views of main parts depicting an example of the nailing machine of the embodiment and an operation example.

A nailing machine 1A of the embodiment includes a main body part 10 and a handle part 11 extending from the main body part 10 and configured to be gripped by a hand. The nailing machine 1A includes a nose part 12 provided at one side of the main body part 10 and configured to strike out a fastener therefrom. In below descriptions, considering a using aspect of the nailing machine 1A, the side at which the nose part 12 is provided is referred to as 'lower side'.

The nailing machine 1A includes a tank mounting part 13, to which a fuel tank (not shown) having fuel filled therein is detachably mounted and which is provided substantially in parallel with the handle part 11 below the handle part. Also, the nailing machine 1A includes a magazine 14 configured to share fasteners with the nose part 12 and provided below the tank mounting part 13. Also, the nailing machine 1A includes an air plug 15 to which an air hose, to which compressed air that is compressed oxidant is to be supplied from a supply source such as an air compressor, is connected and which is provided to the tank mounting part 13, in the embodiment.

Also, the nailing machine 1A includes an operation trigger 16 configured to actuate the nailing machine 1A and provided to the handle part 11. A battery 17 which is a power supply of the nailing machine 1A is mounted to a battery mounting part 18. The battery mounting part is provided to the handle part 11.

The nailing machine 1A includes a striking cylinder 2 configured to be actuated by a combustion pressure of a mixed gas of compressed air and fuel, a combustion chamber 3 in which the mixed gas of compressed air and fuel is to be combusted, a head valve 4 configured to open and close communication between the striking cylinder 2 and the combustion chamber 3, and a valve support member 5 configured to support the head valve 4.

The striking cylinder 2 is an example of the striking mechanism, and includes a driver 20 configured to strike out a fastener supplied from the magazine 14 to the nose part 12 and a piston 21 to which the driver 20 is provided. The striking cylinder 2 has a cylindrical space in which the piston 21 can be slid, and is configured so that the driver 20 is to move along the extension direction of the nose part 12 by a reciprocal operation of the piston 21.

The striking cylinder 2 has a piston position restraint part 2*a* provided at a peripheral edge of an upper end and formed to have a tapered shape of which a diameter increases upward. When the piston 21 is moved upward, a piston ring 21*a* provided on an outer peripheral surface of the piston 21 is engaged to the piston position restraint part 2*a*, so that a top dead point position of the piston 21 is defined. In the meantime, the engagement of the piston 21 with the piston position restraint part 2*a* is released by a force of pushing the piston 21 by a combustion pressure, so that the piston 21 can move by the combustion pressure.

Also, the striking cylinder 2 includes a buffer material 22 with which the piston 21 is to collide. The buffer material 22 is configured by an elastic member and is provided at a lower part of the striking cylinder 2. In the striking cylinder 2, the piston 21 having moved by an operation of striking out a fastener collides with the buffer material 22, so that movement ranges of the driver 20 and the piston 21 are restrained.

The combustion chamber 3 is provided above the striking cylinder 2 along axial directions of the driver 20 and the piston 21, which are an axial direction of the striking cylinder 2. The striking cylinder 2 and the combustion chamber 3 are partitioned by a partitioning part 50, and the partitioning part 50 is provided with a striking cylinder inlet 51 through which high temperature and high pressure combusted air is to pass. The striking cylinder inlet 51 is an example of the striking mechanism inlet, and is configured by forming a circular opening on axes of the driver 20 and the piston 21, which are the axial direction of the striking cylinder 2.

The combustion chamber 3 has the valve support member 5 provided around the striking cylinder inlet 51, and a ring-shaped space formed around the valve support member 5. Therefore, the combustion chamber 3 is arranged radially outside of the valve support member 5 and the head valve 4.

Figure 6:
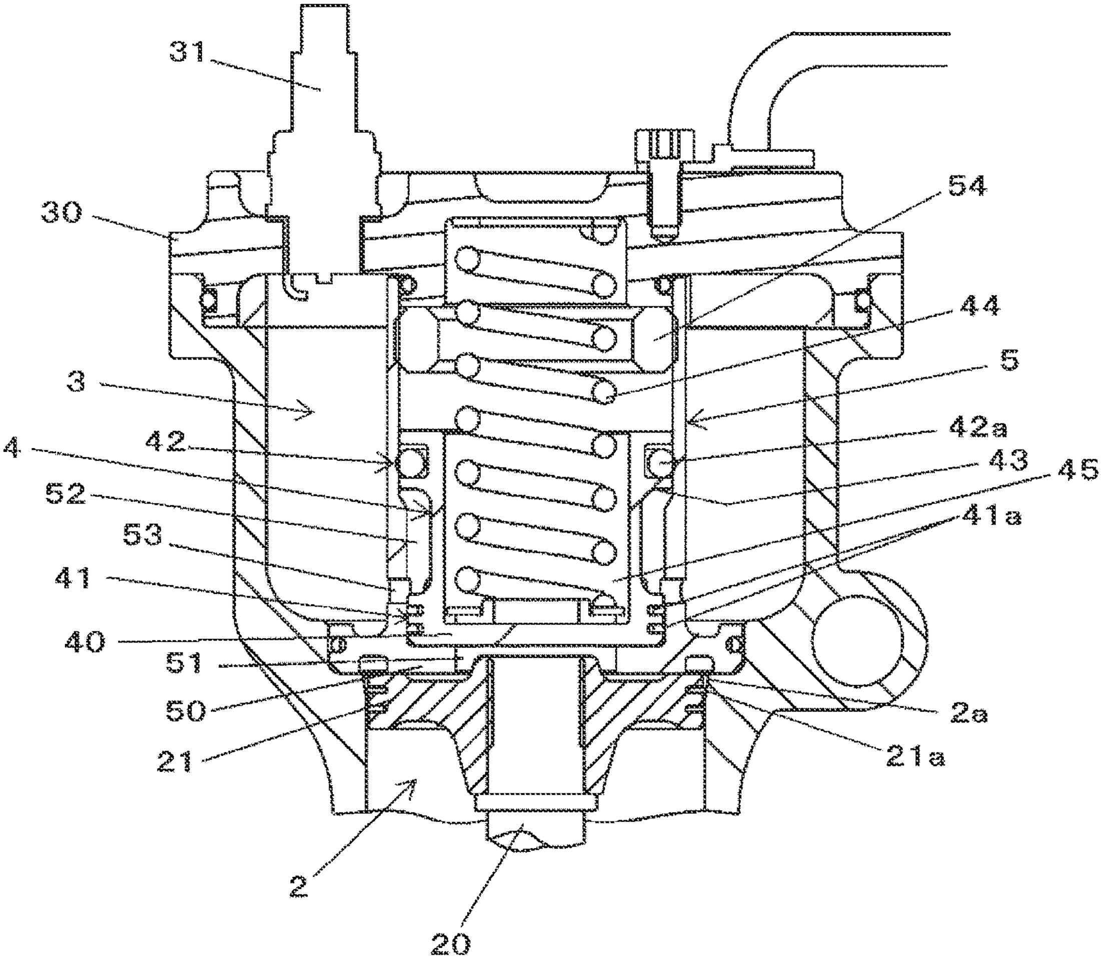
FIG. 6 is a configuration view of main parts depicting an example of the nailing machine of the embodiment and an operation example.
Figure 7:
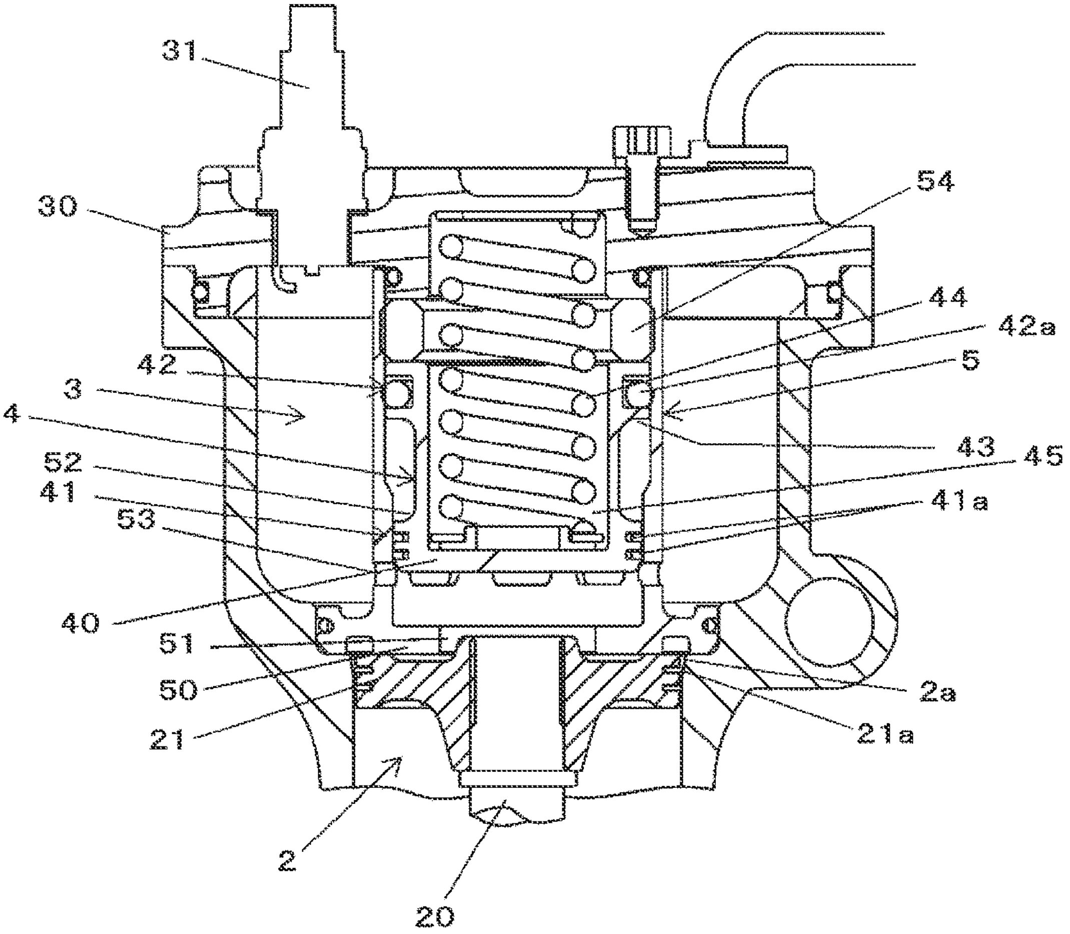
FIG. 7 is a configuration view of main parts depicting an example of the nailing machine of the embodiment and an operation example.

The head valve 4 is an example of the valve member, and is configured by a cylindrical metal member. As shown in FIGS. 6 and 7, the head valve 4 has a circular planar valve surface 40 of which a lower end face in an axial direction of the cylinder is closed. The head valve 4 has a configuration where a diameter of the valve surface 40 is larger than the striking cylinder inlet 51. The striking cylinder inlet 51 is closed in a state where the valve surface 40 is in contact with the partitioning part 50.

The head valve 4 has a first seal part 41 and a second seal part 42. The first seal part 41 is an example of the seal part, is provided on an outer periphery of the valve surface 40 in the axial direction, which is a moving direction of the head valve 4, and is attached with a first seal material 41*a*. The first seal material 41*a* is configured by a metal ring referred to as a piston ring. The first seal part 41 has a circumferential groove in which the first seal material 41*a* is fitted. When the first seal material 41*a* is attached to the first seal part, the first seal material 41*a* protrudes from a circumferential surface by a predetermined amount. In the case of the first seal part 41 of the embodiment, the two first seal materials 41*a* are attached along the axial direction of the head valve 4.

The second seal part 42 is an example of the seal part, is provided on the outer periphery of the head valve 4 with being spaced from the first seal part 41 by a predetermined distance along the axial direction of the head valve 4, and is attached with a second seal material 42*a*. The second seal material 42*a* is a so-called O-ring made of an elastic body such as rubber. The second seal part 42 has a circumferential groove in which the second seal material 42*a* is fitted. When the second seal material 42*a* is attached to the second seal part, the second seal material 42*a* protrudes from a circumferential surface by a predetermined amount.

The head valve 4 has a configuration where the first seal part 41 and the second seal part 42 protrude outward from the circumferential surface of the head valve 4 and a diameter of the second seal part 42 is larger than a diameter of the first seal part 41. The second seal part 42 has an actuation surface 43 that is a surface facing the first seal part 41 and is to be pushed by a high temperature and high pressure gas. The actuation surface 43 is a ring-shaped surface.

The head valve 4 is configured to be urged in a direction of the partitioning part 50 by a spring 44. The spring 44 is an example of the urging member, and is configured by a coil spring. An axis of the spring 44 is provided on the axes of the driver 20 and the piston 21, which are on the axis of the striking cylinder 2, i.e., is provided coaxially with the head valve 4 and the striking cylinder inlet 51. The spring 44 is introduced into a concave part 45 having an open upper and formed in the head valve 4 along the axial direction, which is a moving direction of the head valve 4, so that the head valve 4 and a part of the spring 44 are arranged so as to overlap each other. This arrangement is referred to as 'overlap arrangement'. Also, in order for the spring 44 to be introduced into the concave part 45 of the head valve 4, a diameter of the spring 44 is made to be smaller than the head valve 4 and the striking cylinder 2.

A force of pushing the head valve 4 by the spring 44 is a force of keeping a contact state of the valve surface 40 with the partitioning part 50 in a state where the high temperature and high pressure gas is not applied to the actuation surface 43.

The head valve 4 is supported to be moveable by the valve support member 5.

The valve support member 5 is an example of the valve support member and is configured by a cylindrical metal member. As shown in FIGS. 6 and 7, in the embodiment, the valve support member 5 has the partitioning part 50 integrally provided at an axial lower part of the cylinder. When the head valve 4 is put in the cylindrical inner space, the first seal material 41*a* of the first seal part 41 and the second seal material 42*a* of the second seal part 42 of the head valve 4 are sliding contacted to the valve support member 5. The valve support member 5 has different inner diameters at parts to which the first seal material 41*a* of the first seal part 41 and the second seal material 42*a* of the second seal part 42 of the head valve 4 are sliding contacted, in conformity to the respective seal parts.

When the head valve 4 is put in the valve support member 5, an actuation space 52 is formed between the first seal part 41 and second seal part 42 of the head valve 4 and an inner surface of the valve support member 5. The actuation space 52 is an annular space.

The valve support member 5 has a head valve inlet (valve member inlet) 53 for connecting the combustion chamber 3 and the actuation space 52. The head valve inlet 53 is configured by providing an opening penetrating the valve support member 5 in the vicinity of the first seal part 41 in a state where the valve surface 40 of the head valve 4 is in contact with the partitioning part 50. The head valve inlet 53 is formed on a side surface of the valve support member 5, so that a flow path connecting the combustion chamber 3 and the actuation space 52 becomes simple and an increase in inflow resistance can be prevented.

As shown in FIG. 6, the head valve inlet 53 is coupled to the actuation space 52 in the state where the valve surface 40 of the head valve 4 is in contact with the partitioning part 50, i.e., in the state where the striking cylinder inlet 51 is closed by the head valve 4.

In contrast, when the high temperature and high pressure gas is applied to the actuation surface 43 of the head valve 4 and the head valve 4 is thus moved upward, as shown in FIG. 7, the striking cylinder inlet 51 is opened and the head valve inlet 53 is coupled to the striking cylinder inlet 51.

The air to pass through the head valve inlet 53 is the high temperature and high pressure air generated by combusting the mixed gas of compressed air and fuel in the combustion chamber 3. Since the high temperature and high pressure gas has lower viscosity than the ordinary temperature and pressure air, the increase in resistance against the gas flow is suppressed even though an opening area of the head valve inlet 53 is small.

The first seal part 41 has the first seal material 41*a* provided on the outer periphery thereof, and the first seal material 41*a* is in contact with the inner surface of the valve support member 5. Since the first seal material 41*a* is fitted in the groove, a part to be exposed to the actuation space 52 is suppressed to the minimum.

The second seal part 42 has the second seal material 42*a* provided on the outer periphery thereof, and the second seal material 42*a* is in contact with the inner surface of the valve support member 5. Since the second seal material 42*a* is fitted in the groove, a part to be exposed to the actuation space 52 is suppressed to the minimum.

The valve support member 5 has a buffer material 54 with which the head valve 4 is to collide. The buffer material 54 is configured by an elastic member and is provided at an upper part of the head valve 4. The head valve 4 having moved due to the high temperature and high pressure gas applied to the actuation surface 43 of the head valve 4 collides with the buffer material 54 of the valve support member 5, so that a movement range of the head valve 4 is restrained. In the meantime, although the movement range of the head valve 4 is restrained by the buffer material 54, when the head valve 4 collides with the buffer material 54, a shock is absorbed by elastic deformation of the buffer material 54. Therefore, a height of the head valve inlet 53 is preferably set to be equal to or smaller than a stroke of the head valve 4. Thereby, when the head valve 4 moves up to a position at which it is to collide with the buffer material 54, the head valve 4 is not exposed to the head valve inlet 53 and the head valve inlet 53 is entirely opened. In this way, an opening amount of the head valve inlet 53 is made constant, so that it is possible to stabilize an output.

The upper opening of the combustion chamber 3 is sealed by a head part 30. The head part 30 is provided with an ignition device 31. Also, the head part 30 is provided with a fuel supply port and a compressed air supply port (not shown). Also, the buffer material 54 is provided to be in contact with the head part 30, so that the shock to be applied to the head part 30 is buffered, durability of a component is improved, a bolt for fastening the head part 30 to the combustion chamber 3 is prevented from being unfastened, and an electric noise is reduced.

Figure 8:
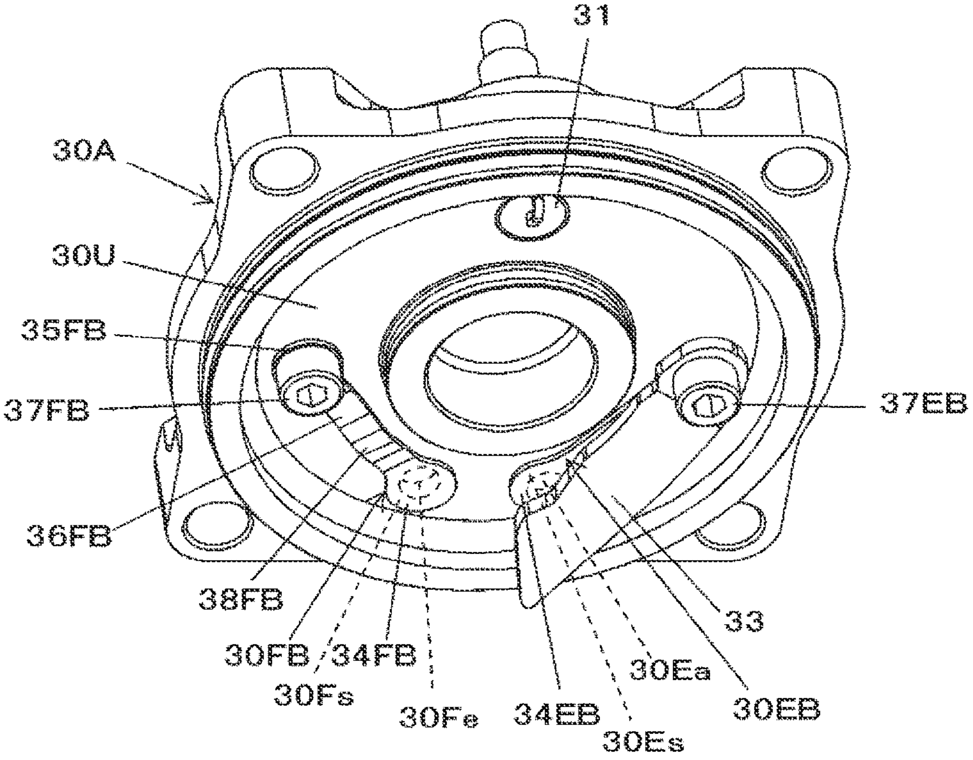
FIG. 8 is a perspective view depicting a first embodiment of a head part.
Figure 9:
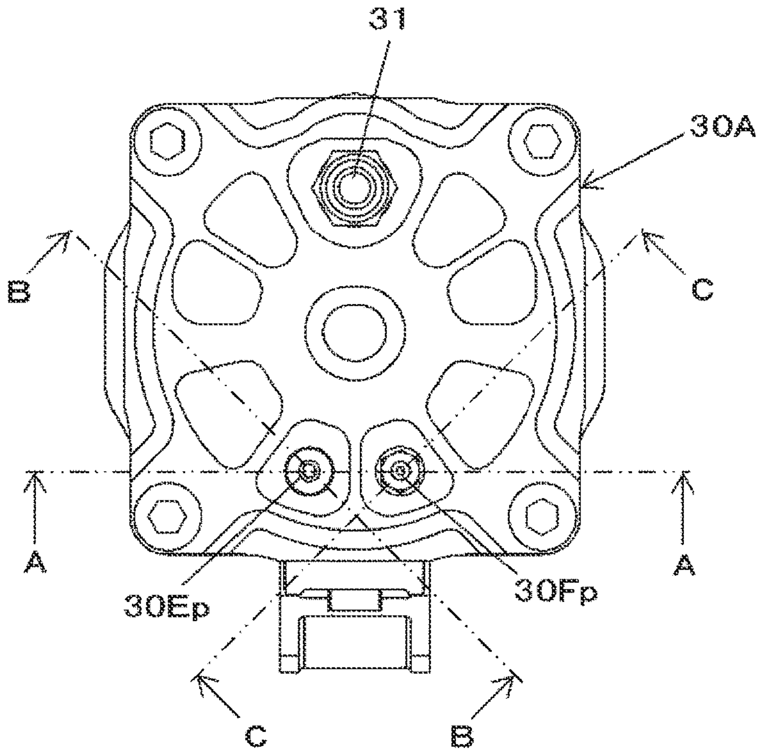
FIG. 9 is a top view of the head part of the first embodiment and a combustion chamber.
Figure 10:
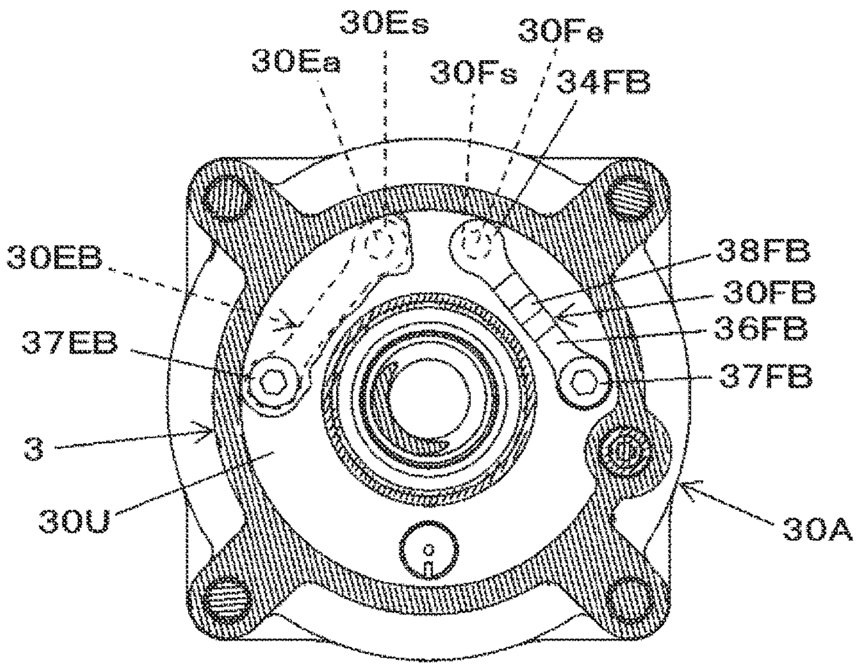
FIG. 10 is a sectional view of the head part of the first embodiment and the combustion chamber.
Figure 11:
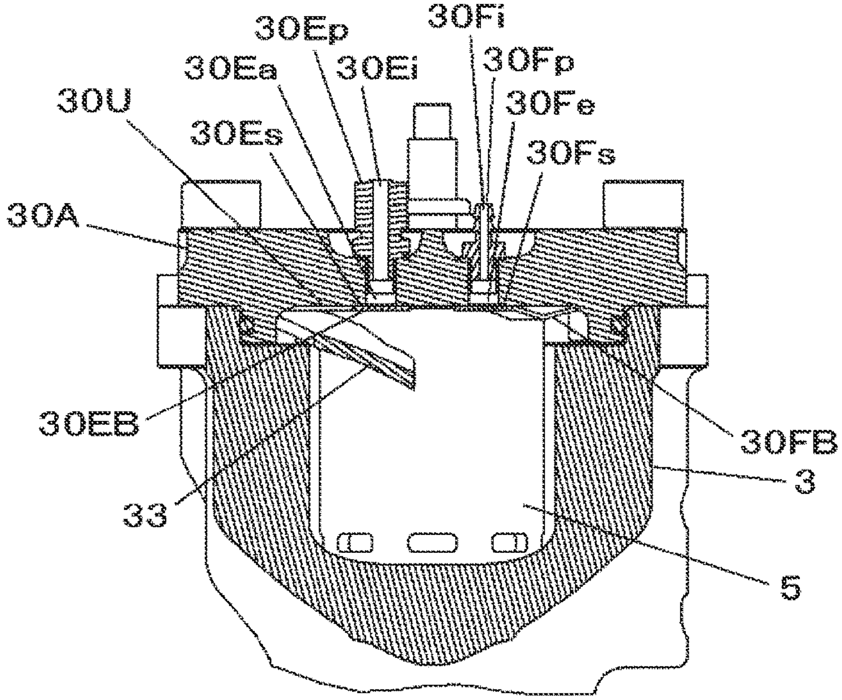
FIG. 11 is a sectional view taken along a line A-A of FIG. 9.
Figure 12:
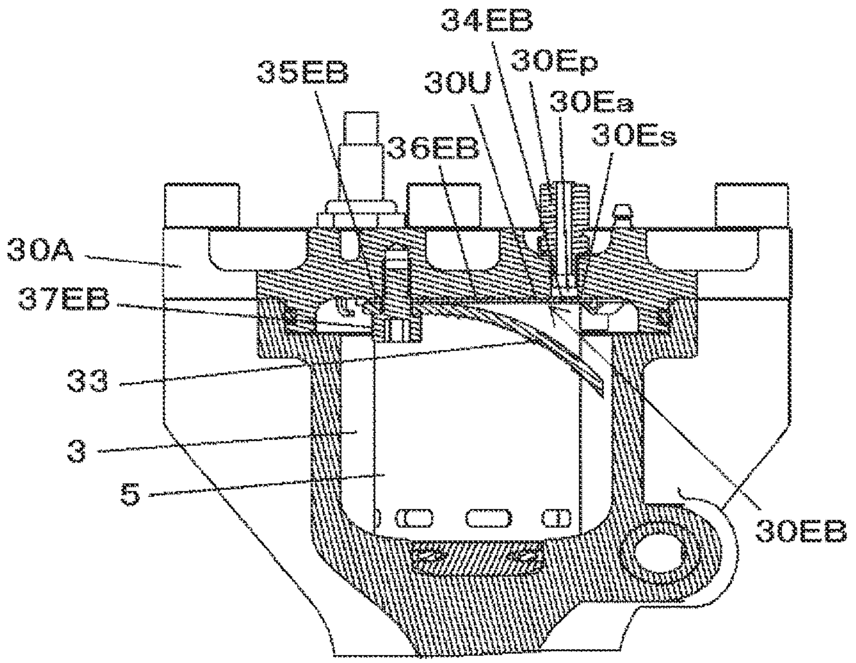
FIG. 12 is a sectional view taken along a line B-B of FIG. 9.
Figure 13:
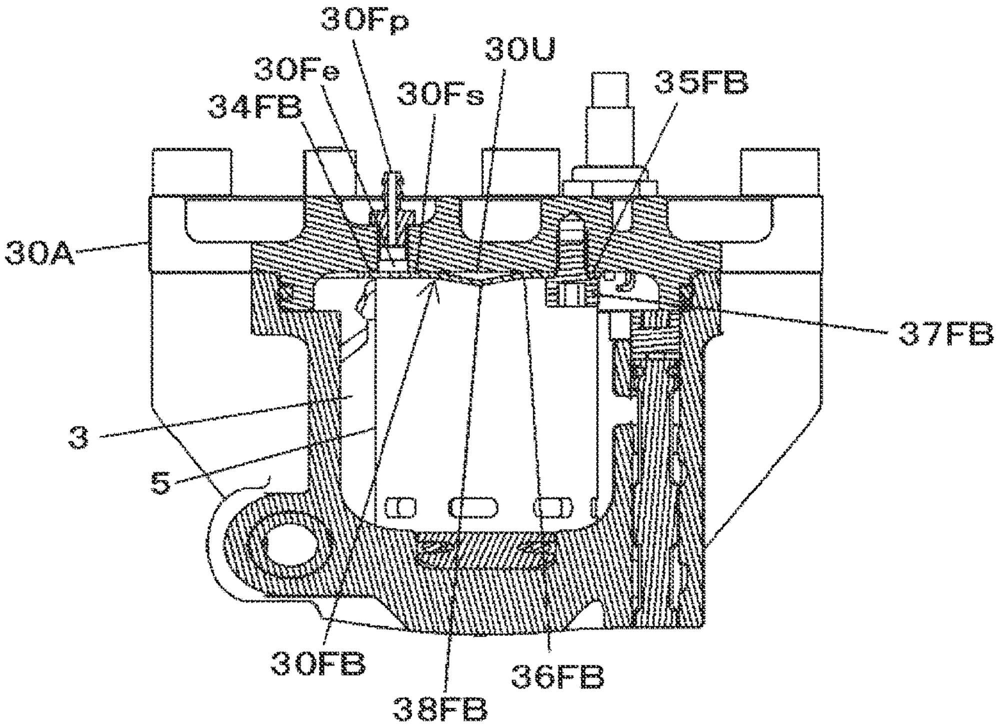
FIG. 13 is a sectional view taken along a line C-C of FIG. 9.

FIG. 8 is a perspective view depicting a first embodiment of the head part, FIG. 9 is a top view of the head part of the first embodiment and the combustion chamber, and FIG. 10 is a sectional view of the head part of the first embodiment and the combustion chamber. Also, FIG. 11 is a sectional view taken along a line A-A of FIG. 9, FIG. 12 is a sectional view taken along a line B-B of FIG. 9, and FIG. 13 is a sectional view taken along a line C-C of FIG. 9.

A head part 30A, which is the first embodiment of the head part 30, is provided with an ignition device 31. Also, the head part 30A is provided with a fuel supply port 30Fe to which the fuel is to be supplied and an air supply port 30Ea to which the compressed air is to be supplied. The head part 30A has the fuel supply port 30Fe and the air supply port 30Ea provided in parallel with each other.

The fuel supply port 30Fe is configured by providing an opening to penetrate a top surface 30U, which is an inner wall surface of the head part 30A facing the combustion chamber 3, and is attached with a fuel pipe conduit connection member 30Fp to which a fuel pipe conduit 30Fi shown in FIG. 2 is to be connected. Also, the air supply port 30Ea is an example of the oxidant supply port, is configured by providing an opening to penetrate the top surface 30U of the head part 30A, and is attached with an air pipe conduit connection member 30Ep to which an air pipe conduit 30Ei shown in FIGS. 2 and 3 is to be connected.

Also, the head part 30A has a fuel-side lead valve 30FB configured to suppress back-flow of flame, gas and the like from the combustion chamber 3 to the fuel supply port 30Fe and an air-side lead valve 30EB configured to suppress back-flow of flame, gas and the like from the combustion chamber 3 to the air supply port 30Ea. Also, the head part 30A has an air stirring part 33 configured to change an outflow direction of the compressed air to be supplied from the air supply port 30Ea.

The fuel-side lead valve 30FB is an example of the check valve, is configured by an elastic metal plate, and has a valve part 34FB configured to open/close the fuel supply port 30Fe, a fixed part 35FB to be fixed to the head part 30A, and an elastic part 36FB configured to couple the valve part 34FB and the fixed part 35FB.

The fuel-side lead valve 30FB has such a shape that the valve part 34FB is to cover the entire fuel supply port 30Fe. Also, the fixed part 35FB of the fuel-side lead valve 30FB, which is distant from the fuel supply port 30Fe at which the valve part 34FB covers the fuel supply port 30Fe, is fixed to the top surface 30U of the head part 30A by a screw 37FB.

The head part 30A is formed on the top surface 30U of a peripheral edge of the fuel supply port 30Fe with a seal part 30Fs that is in contact with the valve part 34FB of the fuel-side lead valve 30FB.

Thereby, when the fixed part 35FB is fixed to the top surface 30U of the head part 30A, the valve part 34FB of the fuel-side lead valve 30FB is pressed to the seal part 30Fs by the elasticity of the elastic part 36FB and the fuel supply port 30Fe is thus closed.

Also, the fuel-side lead valve 30FB is moved in a direction in which the valve part 34FB is connected/separated to/from the seal part 30Fs as the elastic part 36FB is elastically deformed, thereby opening/closing the fuel supply port 30Fe.

The fuel-side lead valve 30FB has an urging part 38FB configured to urge the valve part 34FB in a direction of the seal part 30Fs. As shown in FIG. 13, the urging part 38FB is configured by providing a bent part having a predetermined shape to the elastic part 36FB, and is configured to suppress the valve part 34B from floating from the seal part 30Fs in a state where the fuel supply port 30Fe is closed with the valve part 34B by the elasticity of the elastic part 36B.

The air-side lead valve 30EB is an example of the check valve, is configured by an elastic metal plate, and has a valve part 34EB configured to open/close the air supply port 30Ea, a fixed part 35EB to be fixed to the head part 30A, and an elastic part 36EB configured to couple the valve part 34EB and the fixed part 35EB.

The air-side lead valve 30EB has the fixed part 35EB provided at a side distant from the fuel supply port 30Fe with respect to the arrangement of the fuel supply port 30Fe and the air supply port 30Ea, and the valve part 34EB configured to open/close the air supply port 30Ea and provided between the fixed part 35EB and fuel supply port 30Fe.

The air-side lead valve 30EB has such a shape that the valve part 34EB is to cover the entire air supply port 30Ea. Also, the fixed part 35EB of the air-side lead valve 30EB, which is distant from the air supply port 30Ea at which the valve part 34EB covers the air supply port 30Ea, is fixed to the top surface 30U of the head part 30A by a screw 37EB, together with the air stirring part 33.

The head part 30A is formed on the top surface 30U of a peripheral edge of the air supply port 30Ea with a seal part 30Es that is in contact with the valve part 34EB of the air-side lead valve 30EB.

Thereby, when the fixed part 35EB is fixed to the top surface 30U of the head part 30A, the valve part 34EB of the air-side lead valve 30EB is pressed to the seal part 30Es by the elasticity of the elastic part 36EB and the air supply port 30Ea is thus closed.

Also, the air-side lead valve 30EB is moved in a direction in which the valve part 34EB is connected/separated to/from the seal part 30Es as the elastic part 36EB is elastically deformed, thereby opening/closing the air supply port 30Ea.

The air stirring part 33 is an example of the stirring part, is configured by a metal plate having predetermined stiffness capable of suppressing deformation, which is caused due to a pressure of the compressed air to be supplied from the air supply port 30Ea and a combustion pressure in the combustion chamber 3, extends along an inner peripheral surface of the combustion chamber 3, and has a shape covering the air-side lead valve 30EB.

A side of the air stirring part 33 distant from the fuel supply port 30Fe sandwiches the fixed part 35EB of the air-side lead valve 30EB between the side and the top surface 30U, and is fixed to the top surface 30U by the screw 37EB.

The air stirring part 33 has such a shape that is curved in a direction in which an interval from the top surface 30U increases from the side fixed to the top surface 30U toward a tip end-side facing the valve part 34B of the air-side lead valve 30EB, and a part between the tip end-side of the air stirring part 33 and the air supply port 30Ea to be opened/closed by the air-side lead valve 30EB opens toward the fuel supply port 30Fe.

The air stirring part 33 has a space, in which the air-side lead valve 30EB can be elastically deformed, provided between the air stirring part and the top surface 30U. Also, the air stirring part 33 has a curved surface, which faces the air-side lead valve 30EB and with which the elastically deformed air-side lead valve 30EB can be in contact.

Also, the air stirring part 33 has one side part, which faces the inner peripheral surface of the combustion chamber 3 and has a circular arc shape conforming to the inner peripheral surface of the combustion chamber 3.

Thereby, the air stirring part 33 stirs the compressed air, which is supplied from the air supply port 30Ea as the air-side lead valve 30EB is opened, and generates a flow of the air to rotate with swirling in a spiral shape along the inner peripheral surface of the combustion chamber 3. Also, the part between the tip end-side of the air stirring part 33 and the air supply port 30Ea is opened toward the fuel supply port 30Fe, so that the compressed air supplied from the air supply port 30Ea flows toward the fuel supply port 30Fe.

The nailing machine 1A includes a blowback chamber 6 for collecting the gas to return the driver 20 and the piston 21 of the striking cylinder 2. The blowback chamber 6 is provided around the striking cylinder 2 and is coupled to an inside of the striking cylinder 2 at an inlet/outlet 60 provided in the vicinity of the buffer material 22.

The nailing machine 1A has an exhaust valve 7 configured to exhaust the gas in the striking cylinder 2 and the combustion chamber 3. The exhaust valve 7 is provided at one side part of the striking cylinder 2 with respect to the extension direction of the handle part 11, and includes an exhaust piston 71 configured to be pushed by a gas introduced into the blowback chamber 6, a first exhaust valve 72 configured to open/close a striking cylinder exhaust port 23 formed in the striking cylinder 2, a second exhaust valve 73 configured to open/close a combustion chamber exhaust port 32 formed in the combustion chamber 3, and a valve rod 74 coupling the exhaust piston 71, the first exhaust valve 72 and the second exhaust valve 73.

The exhaust piston 71, the first exhaust valve 72, the second exhaust valve 73, and the valve rod 74 of the exhaust valve 7 are integrally made of metal. The exhaust valve 7 is configured so that movement of the exhaust piston 71 is to be transmitted to the first exhaust valve 72 and the second exhaust valve 73 via the valve rod 74 and the first exhaust valve 72 and the second exhaust valve 73 are thus to move in conjunction with the movement.

Also, the exhaust valve 7 includes an exhaust cylinder 75 to be coupled to the blowback chamber 6, and an exhaust flow path forming cylinder 76 to be coupled to the striking cylinder exhaust port 23 and the combustion chamber exhaust port 32. The exhaust cylinder 75 has a cylindrical space, in which the exhaust piston 71 can be slid, provided at one side part of the striking cylinder 2 with respect to the extension direction of the handle part 11, and the exhaust valve 7 is configured to move in the extension direction of the valve rod 74 by a reciprocal operation of the exhaust piston 71.

The exhaust flow path forming cylinder 76 has a cylindrical space, in which the first exhaust valve 72 and the second exhaust valve 73 can be slid, provided at one side part of the striking cylinder 2 with respect to the extension direction of the handle part 11, and extends in a moving direction of the piston 21.

The striking cylinder exhaust port 23 is formed by an outer opening 23*a* penetrating the exhaust flow path forming cylinder 76 and an outside and an inner opening 23*b* penetrating the exhaust flow path forming cylinder 76 and the striking cylinder 2, and is configured to communicate the outside and the inside of the striking cylinder 2 via the exhaust flow path forming cylinder 76.

The inner opening 23*b* of the striking cylinder exhaust port 23 is provided to face a top dead point position of the piston 21 so that the gas in the striking cylinder 2 can be exhausted to the outside by a return operation of the piston 21 from a bottom dead point position to the top dead point position. Also, the outer opening 23*a* of the striking cylinder exhaust port 23 opens toward a side of the striking cylinder 2, and the outer opening 23*a* and the inner opening 23*b* are arranged on one line.

The combustion chamber exhaust port 32 is formed by an outer opening 32*a* penetrating the exhaust flow path forming cylinder 76 and the outside and an inner opening 32*b* penetrating the exhaust flow path forming cylinder 76 and the combustion chamber 3, and is configured to communicate the outside and the inside of the combustion chamber 3 via the exhaust flow path forming cylinder 76.

The outer opening 32*a* of the combustion chamber exhaust port 32 opens toward a side of the striking cylinder 2, and the outer opening 32*a* and the inner opening 32*b* are arranged with being vertically offset in the moving direction of the second exhaust valve 73.

The first exhaust valve 72 has a substantially circular column shape conforming to an inner peripheral surface of the exhaust flow path forming cylinder 76, and has a pair of sealing parts 72*a*, 72*b* having diameters capable of slidably contacting the inner surface of the exhaust flow path forming cylinder 76 and a flow path forming part 72*c* provided between the pair of sealing parts 72*a*, 72*b*, having a substantially circular column shape of a diameter smaller than the sealing parts 72*a*, 72*b* and forming a space between the flow path forming part and the inner surface of the exhaust flow path forming cylinder 76.

The second exhaust valve 73 has a substantially circular plate shape conforming to the inner peripheral surface of the exhaust flow path forming cylinder 76 and includes a sealing member 73*a* provided on an outer peripheral surface thereof. The sealing member 73*a* is configured by an O-ring, for example, and the sealing member 73*a* is configured to sliding contact the inner peripheral surface of the exhaust flow path forming cylinder 76.

As shown in FIG. 1, the first exhaust valve 72 has such a configuration that when the flow path forming part 72*c* is moved to a position facing the outer opening 23*a* and the inner opening 23*b* of the striking cylinder exhaust port 23, the outer opening 23*a* and the inner opening 23*b* of the striking cylinder exhaust port 23 communicate with each other by the space formed between the inner surface of the exhaust flow path forming cylinder 76 and the flow path forming part 72*c* and the striking cylinder exhaust port 23 opens.

Also, when the flow path forming part 72*c* is moved to the position facing the outer opening 23*a* and the inner opening 23*b* of the striking cylinder exhaust port 23, the upper exhaust flow path forming cylinder 76 of the flow path forming part 72*c* is sealed by one sealing part 72*a* and the lower exhaust flow path forming cylinder 76 is sealed by the other sealing part 72*b*.

The sealing parts 72*a*, 72*b* are made of metal and are not provided with a sealing member such as an O-ring but implement a sealing structure by dimensions of outer diameters of the sealing parts 72*a*, 72*b* and an inner diameter of the exhaust flow path forming cylinder 76.

In a state where the striking cylinder exhaust port 23 is opened by the first exhaust valve 72, the second exhaust valve 73 moves to the upper of the inner opening 32*b* of the combustion chamber exhaust port 32, so that the inner opening 32*b* and the outer opening 32*a* of the combustion chamber exhaust port 32 communicate with each other therebetween by the exhaust flow path forming cylinder 76 and the combustion chamber exhaust port 32 opens, as shown in FIG. 1.

Also, in the state where the second exhaust valve 73 has moved to the upper of the inner opening 32*b* of the combustion chamber exhaust port 32, the sealing part 72*a* of the first exhaust valve 72 is located below the outer opening 32*a* of the combustion chamber exhaust port 32, so that the striking cylinder exhaust port 23 and the combustion chamber exhaust port 32 are sealed therebetween by the sealing part 72*a* of the first exhaust valve 72.

In this way, the exhaust valve is configured by the first exhaust valve 72, the striking cylinder exhaust port 23 and the exhaust flow path forming cylinder 76, and the combustion chamber exhaust valve is configured by the second exhaust valve 73, the combustion chamber exhaust port 32 and the exhaust flow path forming cylinder 76.

Also, the first exhaust valve 72, the striking cylinder exhaust port 23 and the exhaust flow path forming cylinder 76 are provided at one side part of the striking cylinder 2, and the striking cylinder exhaust port 23 faces toward a side of the striking cylinder 2. Also, the second exhaust valve 73, the combustion chamber exhaust port 32 and the exhaust flow path forming cylinder 76 are provided at one side part of the combustion chamber 3, and the combustion chamber exhaust port 32 faces toward a side of the combustion chamber 3.

Also, the exhaust valve 7 has a buffer material 77 with which the exhaust piston 71 is to collide. The buffer material 77 is configured by an elastic member. The exhaust piston 71 collides with the buffer material 77, so that a movement range of the exhaust valve 7 is restrained.

Also, the exhaust valve 7 includes a spring 79 configured to urge the valve rod 74 in a direction in which the first exhaust valve 72 is to close the striking cylinder exhaust port 23 and the second exhaust valve 73 is to close the combustion chamber exhaust port 32. The spring 79 is an example of the urging member, is configured by a compression coil spring, in the embodiment, and is interposed between a spring receiving part 24 provided on a side surface of the striking cylinder 2 and a spring retainer 74*a* attached to the valve rod 74.

The spring retainer 74*a* is configured to move integrally with the valve rod 74. When the valve rod 74 is moved in a direction of compressing the spring 79 by the spring retainer 74*a*, the first exhaust valve 72 opens the striking cylinder exhaust port 23 and the second exhaust valve 73 opens the combustion chamber exhaust port 32. Also, when the valve rod 74 is moved in a direction in which the spring 79 is to extend, the first exhaust valve 72 closes the striking cylinder exhaust port 23 and the second exhaust valve 73 closes the combustion chamber exhaust port 32.

The nailing machine 1A has a contact member 8 provided in the nose part 12. The contact member 8 is provided to be moveable along the extension direction of the nose part 12, and is urged by a spring 80 in a direction in which it is to protrude from the nose part 12. The contact member 8 is coupled to the exhaust valve 7 via a link 81. The link 81 is attached to a side surface of the striking cylinder 2 to be rotatable about a shaft 81*d*, which is a support point, and is coupled at one end to the contact member 8. The link 81 is urged by the spring 80 such as a tensile coil spring, so that the contact member 8 rotates in the direction in which it protrudes from the nose part 12.

Also, the other end of the link 81 is coupled to the exhaust valve 7 via a long hole portion 78 formed in the valve rod 74. The long hole portion 78 is an opening extending in the moving direction of the valve rod 74 and is configured so that the valve rod 74 can move in a state where a position of the link 81 is fixed by the contact member 8.

Thereby, the link 81 rotates in conjunction with movement of the contact member 8, so that the exhaust valve 7 is actuated. Also, in the state where a position of the link 81 is fixed by the contact member 8, the link 81 and the valve rod 74 are decoupled with shapes of the link 81 and of the long hole portion 78 and the exhaust valve 7 is actuated by the gas introduced into the blowback chamber 6.

Operation Example of Nailing Machine of Embodiment

Subsequently, an operation of the nailing machine 1A of the embodiment is described with reference to the respective drawings. In an initial state, the operation trigger 16 is not pulled, and the contact member 8 is not pressed to a material to be struck and is located at an initial position at which it is urged by the spring 80 and protrudes from the nose part 12.

In a state where the contact member 8 is located at an initial position, the link 81 is urged by the spring 80 to push the long hole portion 78 of the valve rod 74, so that the valve rod 74 is moved in the direction of compressing the spring 79. As shown in FIG. 1, the flow path forming part 72*c* of the first exhaust valve 72 of the exhaust valve 7 is moved to the position facing the outer opening 23*a* and the inner opening 23*b* of the striking cylinder exhaust port 23, so that the striking cylinder exhaust port 23 is opened. Also, the second exhaust valve 73 is moved to the upper side of the inner opening 32*b* of the combustion chamber exhaust port 32 in conjunction with the first exhaust valve 72, so that the inner opening 32*b* and the outer opening 32*a* of the combustion chamber exhaust port 32 communicate with each other therebetween by the exhaust flow path forming cylinder 76 and the combustion chamber exhaust port 32 is opened. Thereby, the striking cylinder 2 and the combustion chamber 3 are opened to the atmosphere.

Also, the head valve 4 is pressed by the spring 44 and is thus in the state where the valve surface 40 is in contact with the partitioning part 50, i.e., in the state where the striking cylinder inlet 51 is closed by the head valve 4. In this state, the head valve inlet 53 is connected to the actuation space 52.

When the contact member 8 is pressed to a material to be struck, the link 81 is rotated in a direction of extending the spring 80, so that the valve rod 74 is moved in the extension direction of the spring 79 in conformity to the rotation of the link 81 and the movement of the contact member 8 is transmitted to the exhaust valve 7 by the link 81.

Also, the air valve 30EV and the fuel valve 30FV are opened in conjunction with the contact member 8 and an operation of the operation trigger 16, so that the gasified fuel and the compressed air are supplied to the combustion chamber 3. For example, when the contact member 8 is pressed to the material to be struck, the fuel valve 30FV is opened, and when the operation trigger 16 is operated, the air valve 30EV is opened. In the meantime, when the contact member 8 is pressed to the material to be struck and the operation trigger 16 is operated, the air valve 30EV and fuel valve 30FV may be opened at predetermined timings. Also, when the contact member 8 is pressed to the material to be struck, the air valve 30EV and fuel valve 30FV may be opened at predetermined timings.

When the compressed air is supplied to the air supply port 30Ea, the valve part 34EB of the air-side lead valve 30EB is pushed by a pressure of the compressed air and the valve part 34EB is elastically deformed in a direction of separating from the seal part 30Es, so that the air supply port 30Ea is opened. When the compressed air is supplied from the air supply port 30Ea to the combustion chamber 3, it is stirred by the air stirring part 33, so that a flow of air to rotate with swirling in a spiral shape along the inner peripheral surface of the combustion chamber 3 is generated. Also, the part between the tip end-side of the air stirring part 33 and the air supply port 30Ea is opened toward the fuel supply port 30Fe, so that the compressed air supplied from the air supply port 30Ea flows toward the fuel supply port 30Fe.

Also, a degree of opening of the air-side lead valve 30EB is restrained by the air stirring part 33, and an amount of deformation of the elastic part 36EB is suppressed from increasing and the plastic deformation is suppressed while securing a necessary degree of opening of the air-side lead valve 30EB.

When the air valve 30EV is closed and the supply of the predetermined amount of the compressed air is over, the pressure of pushing the valve part 34EB of the air-side lead valve 30EB is lowered, the valve part 34EB is pressed to the seal part 30Es by the elasticity of the elastic part 36EB, and the air supply port 30Ea is closed.

When the fuel is supplied to the fuel supply port 30Fe, the valve part 34FB of the fuel-side lead valve 30FB is pushed by the pressure of the fuel and the valve part 34FB is elastically deformed in the direction of separating from the seal part 30Fs, so that the fuel supply port 30Fe is opened. When the fuel is supplied from the fuel supply port 30Fe to the combustion chamber 3, it is supplied from the air supply port 30Ea to the combustion chamber 3 and is mixed with compressed air stirred by the air stirring part 33, so that the mixed gas of the compressed air and fuel is filled in the combustion chamber 3.

When the fuel valve 30FV is closed and the supply of the predetermined amount of the fuel is over, the pressure of pushing the valve part 34FB of the fuel-side lead valve 30FB is lowered, the valve part 34FB is pressed to the seal part 30Fs by the elasticity of the elastic part 36FB and the urging force of the urging part 38FB, and the fuel supply port 30Fe is closed.

When the compressed air is supplied to the combustion chamber 3, a pressure in the combustion chamber 3 rises. During the pressure rise in the combustion chamber 3 by the compressed air, the head valve 4 is pressed by the spring 44, so that the valve surface 40 is kept in the contact state with the partitioning part 50 and the striking cylinder inlet 51 is closed by the head valve 4. Therefore, even when the pressure in the combustion chamber 3 rises by the supply of the compressed air, the pressure does not rise in the striking cylinder 2 and the piston 21 is not actuated.

The contact member 8 is pressed to the material to be struck and the operation trigger 16 is operated, so that the air valve 30EV and fuel valve 30FV are opened and the air-side lead valve 30EB are opened. Thereby, the compressed air is supplied from the air supply port 30Ea, and the fuel-side lead valve 30FB is opened, so that the fuel is supplied from the fuel supply port 30Fe. Thereafter, when the ignition device 31 is actuated at a predetermined timing at which the air-side lead valve 30EB is closed and the fuel-side lead valve 30FB is closed, the mixed gas of compressed air and fuel in the combustion chamber 3 is combusted. When the mixed gas is combusted in the combustion chamber 3, the pressure in the combustion chamber 3 rises.

As the pressure in the combustion chamber 3 rises, the force of pressing the valve part 34EB of the air-side lead valve 30EB in the state where the air supply port 30Ea is closed to the seal part 30Es increases, and flame and the like, which are generated as the mixed gas is combusted in the combustion chamber 3, are prevented from flowing back from the air supply port 30Ea.

Also, as the pressure in the combustion chamber 3 rises, the force of pressing the valve part 34FB of the fuel-side lead valve 30FB in the state where the fuel supply port 30Fe is closed to the seal part 30Fs increases, and the flame and the like, which are generated as the mixed gas is combusted in the combustion chamber 3, are prevented from flowing back from the fuel supply port 30Fe.

When the pressure in the combustion chamber 3 rises, the high temperature and high pressure gas is introduced from the head valve inlet 53 of the valve support member 5 into the actuation space 52, and the pressure in the actuation space 52 rises, the high temperature and high pressure gas is applied to the actuation surface 43 of the head valve 4, so that the head valve 4 is moved upward with compressing the spring 44. Here, when the pressure in the actuation space 52 rises, the pressure is applied to the surface of the first seal part 41 facing the actuation space 52, too. However, since an area of the actuation surface 43 is larger than the area of the surface of the first seal part 41 facing the actuation space 52, the head valve 4 is moved upward with compressing the spring 44.

As shown in FIG. 7, when the head valve 4 is moved upward, the striking cylinder inlet 51 is opened and the head valve inlet 53 is coupled to the striking cylinder inlet 51. Thereby, the high temperature and high pressure gas is introduced from the combustion chamber 3 into the striking cylinder 2 via the striking cylinder inlet 51, so that the pressure of the striking cylinder 2 rises.

When the pressure of the striking cylinder 2 rises, the piston 21 is pushed to move the piston 21 and the driver 20 in a direction of striking out a fastener, so that a fastener striking operation is performed. When the piston 21 and the driver 20 move in the direction of striking out a fastener, the gas (air) in a piston lower chamber 25 which is one chamber in the striking cylinder 2 partitioned by the piston 21 is enabled to flow from the inlet/outlet 60 into the blowback chamber 6. Also, since the piston 21 passes through the inlet/outlet 60 with compressively deforming the buffer material 22, a part of the high temperature and high pressure gas having driven the piston 21 is introduced into the blowback chamber 6.

Figure 5:
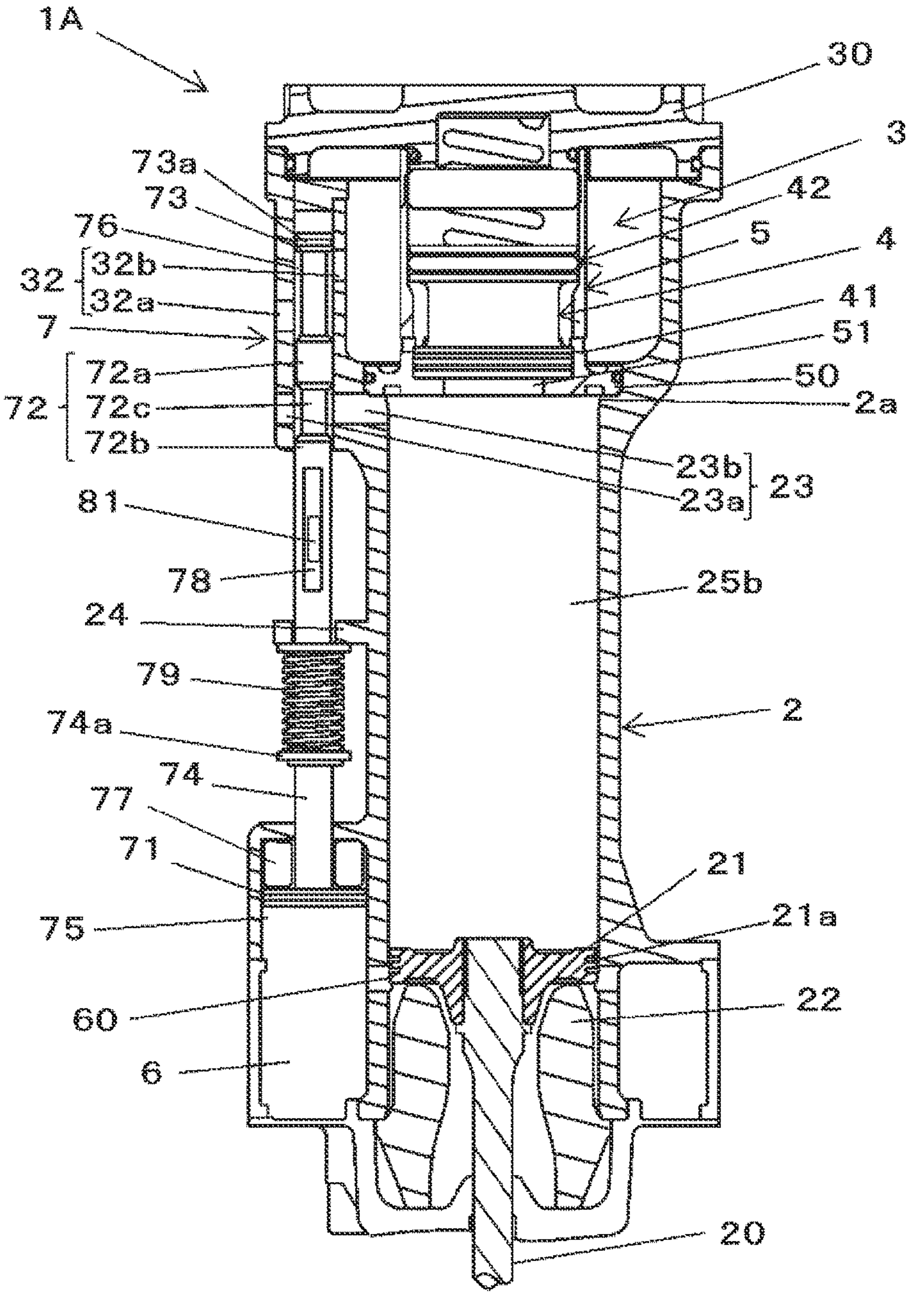
FIG. 5 is a configuration view of main parts depicting an example of the nailing machine of the embodiment and an operation example.

When the gas (air) in the striking cylinder 2 flows into the blowback chamber 6 and the pressure in the blowback chamber 6 rises, the exhaust piston 71 of the exhaust valve 7 is pushed, as shown in FIG. 5. In the state where the exhaust valve 7 and the link 81 are coupled via the long hole portion 78 formed in the valve rod 74 and the position of the link 81 is fixed by the contact member 8, the link 81 and the valve rod 74 are decoupled, so that the exhaust valve 7 can move to the position at which it is to collide with the buffer material 77. Since a moving amount of the exhaust valve 7 is restrained by the buffer material 77, the durability of the exhaust valve 7 is improved.

Thereby, when the exhaust piston 71 of the exhaust valve 7 is pushed, the first exhaust valve 72 is moved to the position at which the flow path forming part 72*c* faces the outer opening 23*a* and the inner opening 23*b* of the striking cylinder exhaust port 23, so that the striking cylinder exhaust port 23 is opened. Also, the second exhaust valve 73 is moved to the upper side of the inner opening 32*b* of the combustion chamber exhaust port 32 in conjunction with the first exhaust valve 72, so that the inner opening 32*b* and the outer opening 32*a* of the combustion chamber exhaust port 32 communicate with each other therebetween by the exhaust flow path forming cylinder 76 and the combustion chamber exhaust port 32 is opened.

Therefore, the striking cylinder 2 and the combustion chamber 3 are opened to the atmosphere, and the gas in the combustion chamber 3 is exhausted from the combustion chamber exhaust port 32 to the outside. Also, the pressure in the combustion chamber 3 is lowered, so that the head valve 4 is pressed with the spring 44 and is moved to the position at which the valve surface 40 is in contact with the partitioning part 50, and the striking cylinder inlet 51 is closed by the head valve 4.

When the piston 21 and the driver 20 are further moved in the direction of striking out a fastener and the piston 21 is moved to a bottom dead point and collides with the buffer material 22, the piston 21 and the driver 20 intend to move upward by the elasticity of the buffer material 22. When the piston 21 moves to the upper of the inlet/outlet 60 through the inlet/outlet 60, the gas (air) in the blowback chamber 6 in which the pressure has risen is introduced into the striking cylinder 2 and pushes the piston 21. When the piston 21 is pushed, the air in the piston upper chamber 25*b*, which is the other chamber in the striking cylinder 2 partitioned by the piston 21, is exhausted from the striking cylinder exhaust port 23 to the outside, and the piston 21 and the driver 20 are returned to the top dead point.

When the contact member 8 separates from the material to be struck, the link 81 is urged by the spring 80 to push the long hole portion 78 of the valve rod 74, so that the valve rod 74 is moved in the direction of compressing the spring 79. Thereby, as shown in FIG. 1, the state where the first exhaust valve 72 opens the striking cylinder exhaust port 23 and the second exhaust valve 73 opens the combustion chamber exhaust port 32 is kept.

Effect Example of Nailing Machine of Embodiment

In the nailing machine 1A of the embodiment, the compressed air and the fuel are supplied to the combustion chamber 3, the mixed gas is combusted to generate the high pressure gas, and the piston 21 of the striking cylinder 2 is pushed by the high pressure gas, so that the force of pushing the fastener by the piston 21 and the driver 20 increases.

Thereby, it is possible to increase an output for striking a fastener, as compared to the gas combustion type nailing machine of the related art in which the ordinary pressure gas is used.

Also, the head valve 4 configured to open and close the striking cylinder inlet 51 between the combustion chamber 3 and the striking cylinder 2 is provided, so that it is possible to disable the striking cylinder 2 from actuating even though the compressed air is just supplied to the combustion chamber 3. Also, the head valve 4 is actuated by the combustion pressure of the mixed gas, so that it is not necessary to provide a separate drive source for driving the head valve 4. Thereby, it is possible to simplify structures of the head valve 4 and the drive mechanism thereof, to miniaturize the device and to save the cost.

Also, the combustion chamber 3 is provided above the striking cylinder 2 along the axial direction of the driver 20 and the piston 21, so that it is possible to reduce the diameter of the combustion chamber 3 without reducing a volume of the combustion chamber 3, as compared to a structure where the combustion chamber is provided around the striking cylinder 2. Since the inside of the combustion chamber 3 is at the high pressure, it is necessary to make the combustion chamber 3 have predetermined strength. However, the diameter or the combustion chamber 3 can be made small, so that it is possible to secure the strength even when the combustion chamber 3 is made thin, and to implement miniaturization and weight saving of the entire device.

Also, the striking cylinder inlet 51 connecting the combustion chamber 3 and the striking cylinder 2 is provided on the axes of the driver 20 and the piston 21, so that it is possible to make the diameter of the striking cylinder inlet 51 smaller than the striking cylinder 2. As a result, it is possible to make the diameter of the head valve 4 smaller than the striking cylinder 2. The diameter of the head valve 4 can be made small, so that it is possible to improve the moving speed of the head valve 4 and to shorten the time necessary to open the striking cylinder inlet 51.

Also, since the gas to actuate the head valve 4 is the high temperature and high pressure gas, the viscosity thereof is lower, as compared to a case where the ordinary pressure gas is combusted. Thereby, it is possible to reduce a diameter of the head valve inlet 53 through which the gas to actuate the head valve 4 is to pass, and to reduce a diameter of a surrounding structure of the combustion chamber 3 and the head valve 4.

The first seal part 41 provided to the head valve 4 has the first seal material 41*a* provided on the outer periphery thereof, and the first seal material 41*a* is in contact with the inner surface of the valve support member 5. Since the first seal material 41*a* is fitted in the groove, the part to be exposed to the actuation space 52 is suppressed to the minimum. While the head valve 4 opens the striking cylinder inlet 51 and the head valve inlet 53, the high temperature and high pressure gas is introduced from the striking cylinder inlet 51 below the head valve 4. However, since the first seal material 41*a* is fitted in the groove, the part to be exposed is suppressed to the minimum.

In the meantime, the high temperature and high pressure gas is applied to the actuation surface 43 of the head valve 4, so that while the head valve 4 moves and the head valve 4 opens the striking cylinder inlet 51 and the head valve inlet 53, the first seal part 41 passes by the head valve inlet 53 and the first seal material 41*a* is thus exposed to the high temperature and high pressure gas. However, since the first seal material 41*a* is made of metal, the first seal material 41*a* is suppressed from being influenced by heat.

Also, the second seal part 42 has the second seal material 42*a* provided on the outer periphery thereof, and the second seal material 42*a* is in contact with the inner surface of the valve support member 5. Since the second seal material 42*a* is fitted in the groove, the part to be exposed to the actuation space 52 is suppressed to the minimum.

The high temperature and high pressure gas is applied to the actuation surface 43 of the head valve 4, so that while the head valve 4 moves and the head valve 4 opens the head valve inlet 53, the second seal material 42*a* is suppressed from being influenced by heat because the exposure of the second seal material 42*a* is suppressed. Also, while the head valve 4 moves and the head valve 4 opens the head valve inlet 53, since the second seal part 42 does not pass by the head valve inlet 53, the second seal material 42*a* is suppressed from being exposed to the high temperature and high pressure gas.

Therefore, the durability of the seal material is improved and the desired performance can be maintained for the longtime use. Also, one seal material (the first seal material 41*a*) of the head valve 4 is made of metal, so that the friction with the valve support member 5 is reduced and it is possible to reduce the diameter of the head valve 4 and to improve the moving speed of the head valve 4. Also, the head valve 4 has the seal material made of metal. Therefore, even when the seal material is arranged on the end face along the moving direction of the head valve 4 and is exposed to the flow path of the gas, it is possible to improve the durability of the seal part.

However, when the seal material made of metal is used, the higher contact pressure is required, as compared to a configuration where a seal material such as an elastic body of rubber is used, so that it is necessary to use the high-load spring. Therefore, in the nailing machine 1A of the embodiment, the spring 44 is arranged on the same axis of the head valve 4, which is a center of the head valve 4, so that it is possible to use the high-load spring without enlarging the main body part 10. Also, the concave part 45 is formed in the axial direction of the head valve 4 and is overlap-arranged so that the spring 44 is to enter therein. Thereby, it is possible to reduce the protruding amount of the spring 44 from the head valve 4, so that it is possible to suppress a size of the main body part 10 in a height direction from increasing. Also, since the spring 44 is to enter the concave part 45 of the head valve 4, the diameter of the spring 44 can be made smaller than the striking cylinder 2, so that it is possible to suppress a size of the main body part 10 in a radial direction from increasing.

When the compressed air is supplied to the air supply port 30Ea, the valve part 34EB of the air-side lead valve 30EB is pushed by the pressure of the compressed air and the elastic part 36EB is elastically deformed in the direction in which the valve part 34EB separates from the seal part 30Es, so that the air supply port 30Ea is opened.

Also, when the supply of the compressed air is over, the pressure of pushing the valve part 34EB of the air-side lead valve 30EB is lowered and the valve part 34EB is pressed to the seal part 30Es by the elasticity of the elastic part 36EB, so that the air supply port 30Ea is closed.

Thereby, it is possible to open/close the air supply port 30Ea by the air-side lead valve 30EB having the simple configuration, depending on whether the compressed air is supplied.

Also, in the air-side lead valve 30EB of which the air supply port 30Ea is closed, as the pressure in the combustion chamber 3 rises, the force of pressing the valve part 34EB to the seal part 30Es increases, in addition to the elasticity of the elastic part 36EB, so that the state where the valve part 34EB is pressed to the seal part 30Es is kept.

The air-side lead valve 30EB is provided on the top surface 30U, and the air supply port 30Ea is not exposed to the combustion chamber 3 in the state where the air supply port 30Ea is closed by the valve part 34EB.

Thereby, it is possible to suppress the flame and the like, which are generated as the mixed gas in the combustion chamber 3 is combusted, from flowing back from the air supply port 30Ea to the air pipe conduit 30Ei, and to suppress damages of the air pipe conduit 30Ei and the air valve 30EV. Also, it is not necessary for the air pipe conduit 30Ei to have the pressure resistance performance corresponding to the combustion pressure, so that it is possible to lower the pressure resistance performance. Thereby, it is possible to use a flexible material and to suppress the damage, which is caused due to vibrations and the like upon the striking.

Also, the degree of opening of the air-side lead valve 30EB is restrained by the air stirring part 33, and the deformation amount of the air-side lead valve 30EB, which is to be deformed by the pressure of the compressed air, is suppressed from increasing, so that it is possible to suppress the air-side lead valve 30EB from being plastically deformed.

Also, the air stirring part 33 has the curved surface with which the elastically deformable air-side lead valve 30EB can be in contact. Therefore, even when the air-side lead valve 30EB, which is to be deformed by the pressure of the compressed air, is pressed to the air stirring part 33, it is possible to suppress the plastic deformation such as a fold line to be formed on the air-side lead valve 30EB.

When the fuel is supplied to the fuel supply port 30Fe, the valve part 34FB of the fuel-side lead valve 30FB is pushed by the pressure of the fuel and the elastic part 36FB is elastically deformed in the direction in which the valve part 34FB is to separate from the seal part 30Fs, so that the fuel supply port 30Fe is opened.

Also, when the supply of the fuel is over, the pressure of pushing the valve part 34FB of the fuel-side lead valve 30FB is lowered and the valve part 34FB is pressed to the seal part 30Fs by the elasticity of the elastic part 36FB and the urging of the urging part 38FB, so that the fuel supply port 30Fe is closed.

Thereby, it is possible to open/close the fuel supply port 30Fe by the fuel-side lead valve 30FB having the simple configuration, depending on whether the fuel is supplied.

Also, in the fuel-side lead valve 30FB of which the fuel supply port 30Fe is closed, as the pressure in the combustion chamber 3 rises, the force of pressing the valve part 34FB to the seal part 30Fs increases, in addition to the elasticity of the elastic part 36FB and the urging of the urging part 38FB, so that the state where the valve part 34FB is pressed to the seal part 30Fs is kept.

The fuel-side lead valve 30FB is provided on the top surface 30U, and the air fuel supply port 30Fe is not exposed to the combustion chamber 3 in the state where the fuel supply port 30Fe is closed by the valve part 34FB.

Thereby, it is possible to suppress the flame and the like, which are generated as the mixed gas in the combustion chamber 3 is combusted, from flowing back from the fuel supply port 30Fe to the fuel pipe conduit 30Fi, and to suppress damages of the fuel pipe conduit 30Fi and the fuel valve 30FV. Also, it is not necessary for the fuel pipe conduit 30Fi to have the pressure resistance performance corresponding to the combustion pressure, so that it is possible to lower the pressure resistance performance. Thereby, it is possible to use a flexible material and to suppress the damage, which is caused due to vibrations and the like upon the striking. Also, even when the fuel remains in the fuel supply port 30Fe and the fuel pipe conduit 30Fi, the remaining fuel is suppressed from being imperfectly combusted and the soot is suppressed from being attached into the fuel pipe conduit 30Fi.

Here, an amount of the fuel to be supplied to the combustion chamber 3 is measured by a method of sending liquefied fuel to a small measurement chamber provided in the fuel valve 30FV and measuring the same by a volume. For this reason, when a gas is mixed in the measurement chamber, it is not possible to perform correct measurement, so that it is not possible to supply a prescribed amount of fuel. Also, in the case of a check valve for which a lead valve is adopted, a gap may be generated between the valve part and the seal part due to bending of the lead valve. The gap is generated between the valve part and the seal part, so that when the compressed air is mixed in the fuel pipe conduit 30Fi, it is not possible to normally supply the fuel because the pressure of the compressed air is higher than the supply pressure of the fuel.

Therefore, the fuel-side lead valve 30FB is provided with the urging part 38FB for urging the valve part 34FB in the direction of the seal part 30Fs, so that the force of pressing the valve part 34FB to the seal part 30Fs increases in the closed state of the fuel supply port 30Fe.

Thereby, it is possible to suppress the fuel-side lead valve 30FB from vibrating, which is caused when the valve part 34FB is floated from the seal part 30Fs and the valve part 34FB is floated from the seal part 30Fs by the pressure of the compressed air stirred by the air stirring part 33, the combustion pressure and the like, so that it is possible to securely seal the valve part 34FB and the seal part 30Fs of the fuel-side lead valve 30FB. Therefore, it is possible to suppress the gas such as the compressed air from being mixed from the fuel pipe conduit 30Fi into the fuel valve 30FV, so that it is possible to normally measure the fuel. Also, it is possible to normally supply the fuel.

Also, when the compressed air is supplied from the air supply port 30Ea to the combustion chamber 3, the air is stirred by the air stirring part 33, so that a flow of the air to rotate with swirling in a spiral shape along the inner peripheral surface of the combustion chamber 3 is generated. Also, the air-side lead valve 30EB is provided with the fixed part 35EB at the side distant from the fuel supply port 30Fe with respect to the arrangement of the fuel supply port 30Fe and the air supply port 30Ea and the side of air-side lead valve 30EB facing toward the fuel supply port 30Fe is opened. Therefore, the part between the tip end-side of the air stirring part 33 and the air supply port 30Ea is opened toward the fuel supply port 30Fe, so that the compressed air supplied from the air supply port 30Ea flows toward the fuel supply port 30Fe.

Thereby, it is possible to widely spread the compressed air over the entire combustion chamber 3 without using a fan to be driven by a motor, to promote the mixing of the compressed air and the fuel supplied from the fuel supply port 30Fe, and to suppress a distribution of the mixed gas from being inclined to one side in the combustion chamber 3, so that it is possible to improve the combustion efficiency.

Other Embodiments of Head Part

Figure 14:
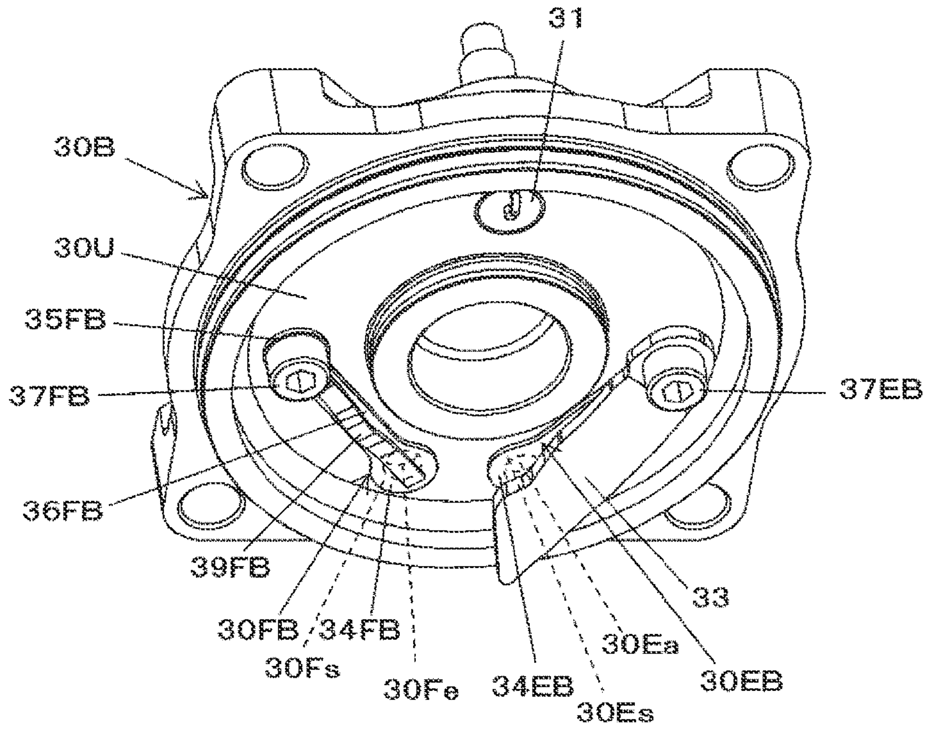
FIG. 14 is a perspective view depicting a second embodiment of the head part.

FIG. 14 is a perspective view depicting a second embodiment of the head part. A head part 30B is provided with the ignition device 31. Also, the head part 30B is provided with the fuel supply port 30Fe to which the fuel is to be supplied and the air supply port 30Ea to which the compressed air is to be supplied. The head part 30B has the fuel supply port 30Fe and the air supply port 30Ea provided in parallel with each other.

Also, the head part 30B has the fuel-side lead valve 30FB configured to suppress back-flow of flame, gas and the like from the combustion chamber 3 to the fuel supply port 30Fe and the air-side lead valve 30EB configured to suppress back-flow of flame, gas and the like from the combustion chamber 3 to the air supply port 30Ea. Also, the head part 30B has the air stirring part 33 configured to stir the compressed air to be supplied from the air supply port 30Ea.

In the meantime, the air-side lead valve 30EB and the air stirring part 33 of the head part 30B of the second embodiment have the same configurations as the head part 30A of the first embodiment, and the descriptions thereof are omitted. Also, the elastic part 36FB of the fuel-side lead valve 30FB has a flat plate shape.

The fuel-side lead valve 30FB includes an urging member 39FB for urging the valve part 34FB in the direction of the seal part 30Fs. The urging member 39FB is configured by an elastic metal plate and has a bent part having a predetermined shape.

The urging member 39FB is fixed with the screw 37FB, together with the fuel-side lead valve 30FB, and is configured to push the valve part 34FB at a tip end-side thereof.

Thereby, the force of pressing the valve part 34FB to the seal part 30Fs increases in the closed state of the fuel supply port 30Fe, so that it is possible to suppress the fuel-side lead valve 30FB from vibrating, which is caused when the valve part 34FB is floated from the seal part 30Fs and the valve part 34FB is floated from the seal part 30Fs by the pressure of the compressed air stirred by the air stirring part 33, the combustion pressure and the like.

Figure 15:
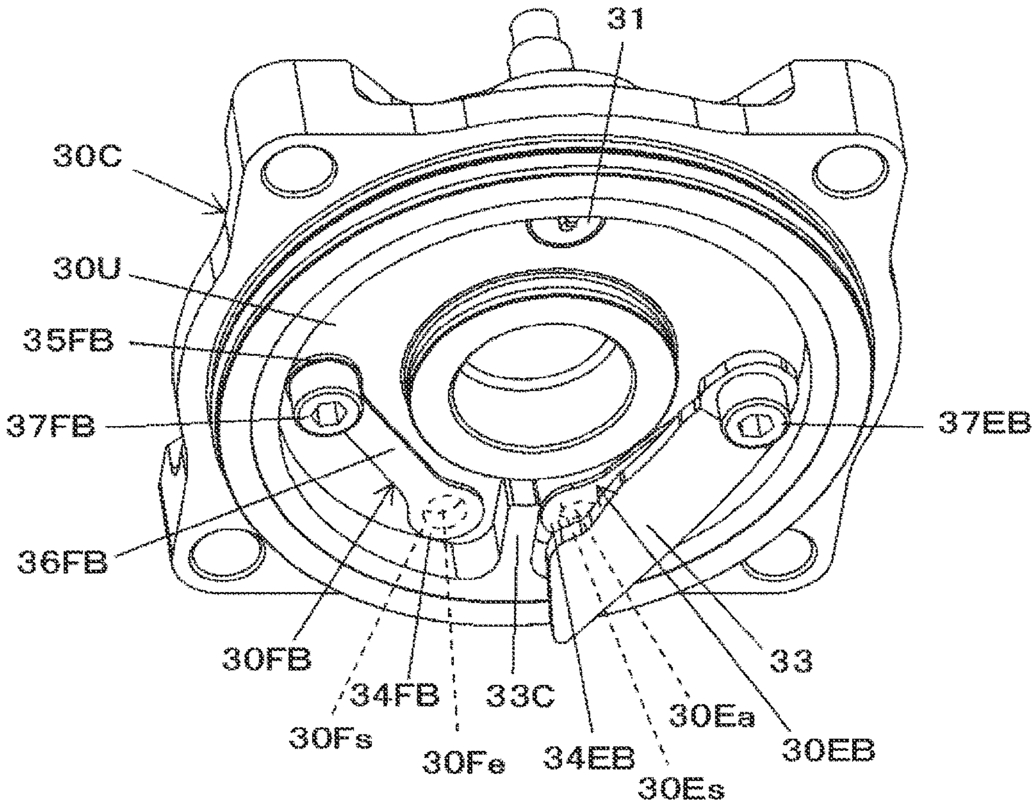
FIG. 15 is a perspective view depicting a third embodiment of the head part.

FIG. 15 is a perspective view depicting a third embodiment of the head part. A head part 30C is provided with the ignition device 31. Also, the head part 30C is provided with the fuel supply port 30Fe to which the fuel is to be supplied and the air supply port 30Ea to which the compressed air is to be supplied. The head part 30C has the fuel supply port 30Fe and the air supply port 30Ea provided in parallel with each other.

Also, the head part 30C has the fuel-side lead valve 30FB configured to suppress back-flow of flame, gas and the like from the combustion chamber 3 to the fuel supply port 30Fe and the air-side lead valve 30EB configured to suppress back-flow of flame, gas and the like from the combustion chamber 3 to the air supply port 30Ea. Also, the head part 30C has the air stirring part 33 configured to stir the compressed air to be supplied from the air supply port 30Ea.

In the meantime, the air-side lead valve 30EB and the air stirring part 33 of the head part 30C of the third embodiment have the same configurations as the head part 30A of the first embodiment, and the descriptions thereof are omitted. Also, the elastic part 36FB of the fuel-side lead valve 30FB has a flat plate shape.

The head part 30C has a shield part 33C provided at a side facing the air supply port 30Ea of the fuel supply port 30Fe and configured to shield a flow of the compressed air supplied from the air supply port 30Ea. The shield part 33C is configured by providing a convex part, which faces inward from an inner peripheral surface of the head part 30C and protrudes from the top surface 30U, between the air supply port 30Ea and fuel supply port 30Fe.

Thereby, the air, which is supplied from the air supply port 30Ea as the air-side lead valve 30EB is opened, is shielded from flowing in the direction of the fuel supply port 30Fe along the top surface 30U by the shield part 33C, so that it is possible to suppress the valve part 34FB of the fuel-side lead valve 30FB from floating from the seal part 30Fs without providing the fuel-side lead valve 30FB with the urging part and without urging the fuel-side lead valve 30FB by the urging member.

Figure 16:
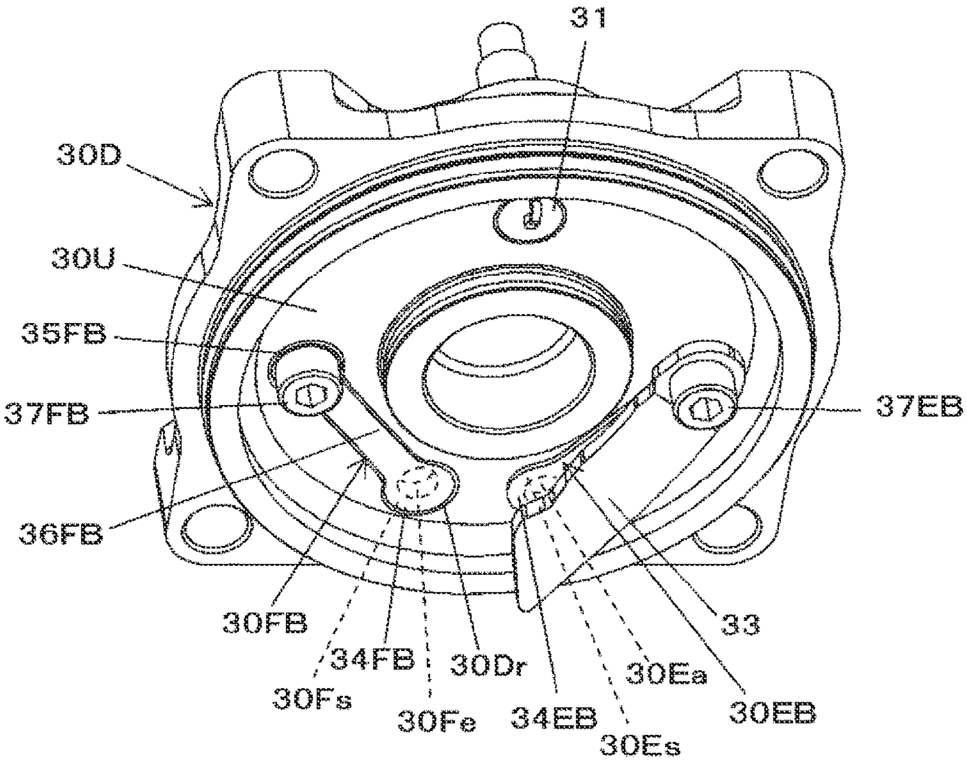
FIG. 16 is a perspective view depicting a fourth embodiment of the head part.

FIG. 16 is a perspective view depicting a fourth embodiment of the head part. A head part 30D is provided with the ignition device 31. Also, the head part 30D is provided with the fuel supply port 30Fe to which the fuel is to be supplied and the air supply port 30Ea to which the compressed air is to be supplied. The head part 30D has the fuel supply port 30Fe and the air supply port 30Ea provided in parallel with each other.

Also, the head part 30D has the fuel-side lead valve 30FB configured to suppress back-flow of flame, gas and the like from the combustion chamber 3 to the fuel supply port 30Fe and the air-side lead valve 30EB configured to suppress back-flow of flame, gas and the like from the combustion chamber 3 to the air supply port 30Ea. Also, the head part 30D has the air stirring part 33 configured to stir the compressed air to be supplied from the air supply port 30Ea.

In the meantime, the air-side lead valve 30EB and the air stirring part 33 of the head part 30D of the fourth embodiment have the same configurations as the head part 30A of the first embodiment, and the descriptions thereof are omitted. Also, the elastic part 36FB of the fuel-side lead valve 30FB has a flat plate shape.

The head part 30D has a step part 30Dr, into which the fuel-side lead valve 30FB is to enter, provided on the top surface 30U. The step part 30Dr has substantially the same depth as a thickness of the fuel-side lead valve 30FB, and is configured by providing a concave part having a shape in which the fuel-side lead valve 30FB is to entirely enter, in the fourth embodiment, and a surface of the fuel-side lead valve 30FB facing the combustion chamber 3 and the top surface 30U arte substantially the same.

Thereby, the air, which is supplied from the air supply port 30Ea as the air-side lead valve 30EB is opened and flows in the direction of the fuel supply port 30Fe along the top surface 30U, is suppressed from colliding between the valve part 34FB and the seal part 30Fs of the fuel-side lead valve 30FB, so that it is possible to suppress the valve part 34FB of the fuel-side lead valve 30FB from floating from the seal part 30Fs without providing the fuel-side lead valve 30FB with the urging part and without urging the fuel-side lead valve 30FB by the urging member. In the meantime, a step part into which the valve part 34FB, not the entire fuel-side lead valve 30FB, is to enter may be provided.

Figure 17:
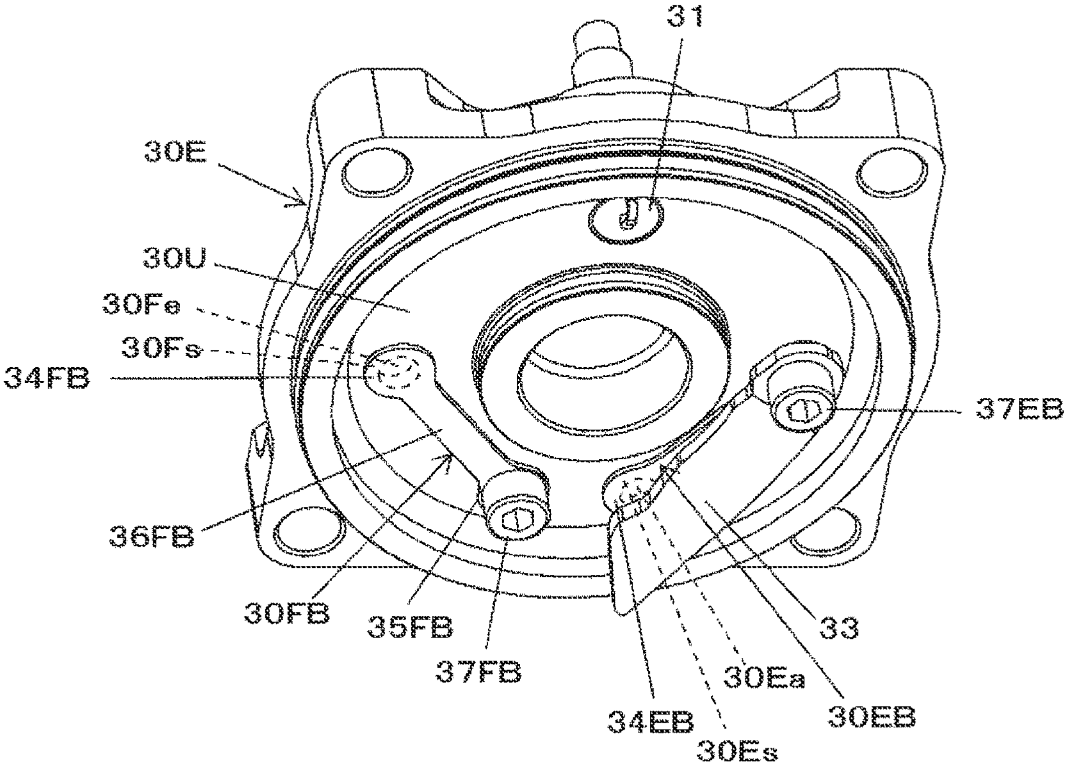
FIG. 17 is a perspective view depicting a fifth embodiment of the head part.

FIG. 17 is a perspective view depicting a fifth embodiment of the head part. A head part 30E is provided with the ignition device 31. Also, the head part 30E is provided with the fuel supply port 30Fe to which the fuel is to be supplied and the air supply port 30Ea to which the compressed air is to be supplied. The head part 30E has the fuel supply port 30Fe provided at a position distant from the air supply port 30Ea.

Also, the head part 30E has the fuel-side lead valve 30FB configured to suppress back-flow of flame, gas and the like from the combustion chamber 3 to the fuel supply port 30Fe and the air-side lead valve 30EB configured to suppress back-flow of flame, gas and the like from the combustion chamber 3 to the air supply port 30Ea. Also, the head part 30E has the air stirring part 33 configured to stir the compressed air to be supplied from the air supply port 30Ea.

In the meantime, the air-side lead valve 30EB and the air stirring part 33 of the head part 30D of the fifth embodiment have the same configurations as the head part 30A of the first embodiment, and the descriptions thereof are omitted. Also, the elastic part 36FB of the fuel-side lead valve 30FB has a flat plate shape.

The fuel-side lead valve 30FB has the fixed part 35FB provided between the valve part 34FB configured to open/close the fuel supply port 30Fe and the air supply port 30Ea, and the fixed part 35EB is provided at a side close to the air supply port 30Ea with respect to the arrangement of the fuel supply port 30Fe and the air supply port 30Ea.

The fixed part 35FB of the fuel-side lead valve 30FB, which is arranged at a side close to the air supply port 30Ea at which the valve part 34FB covers the fuel supply port 30Fe, is fixed to the top surface 30U of the head part 30E by the screw 37FB.

Thereby, the fixed part 35FB of the fuel-side lead valve 30FB is arranged at an upstream side with respect to the flow of the compressed air, which is supplied from the air supply port 30Ea as the air-side lead valve 30EB is opened and is stirred to swirl by the air stirring part 33, and the valve part 34FB and the seal part 30Fs are arranged at a downstream side, so that it is possible to suppress the valve part 34FB from floating from the seal part 30Fs without providing the fuel-side lead valve 30FB with the urging part and without urging the fuel-side lead valve 30FB by the urging member.

Figure 18:
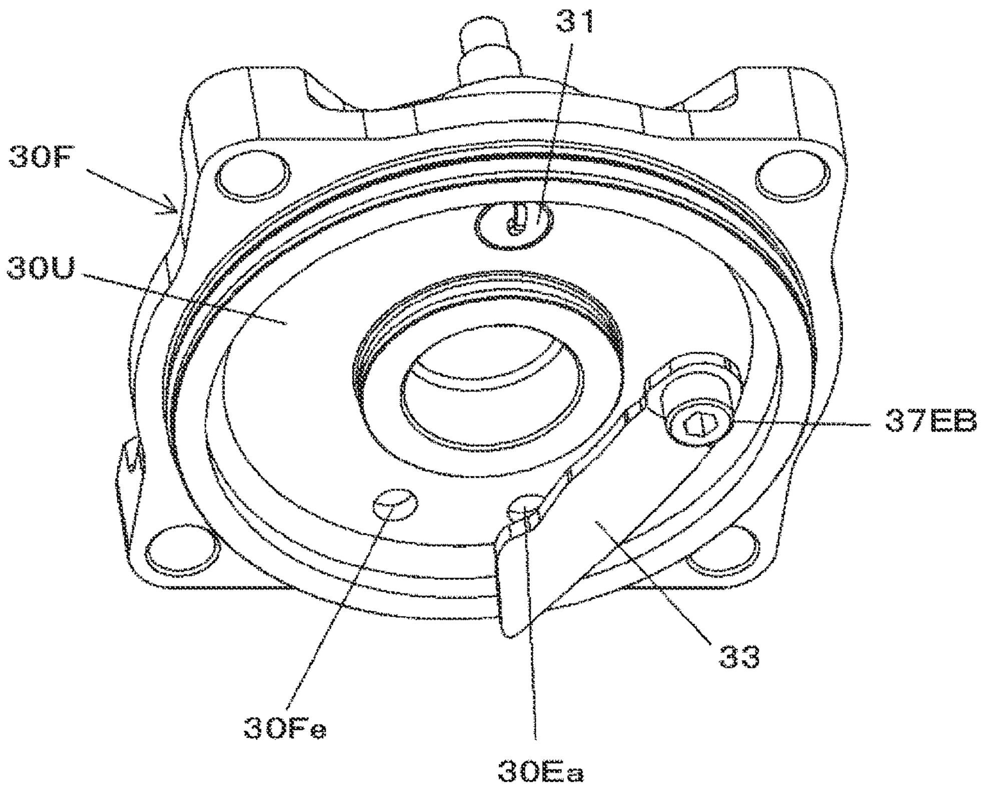
FIG. 18 is a perspective view depicting a sixth embodiment of the head part.

FIG. 18 is a perspective view depicting a sixth embodiment of the head part. A head part 30F is provided with the ignition device 31. Also, the head part 30F is provided with the fuel supply port 30Fe to which the fuel is to be supplied and the air supply port 30Ea to which the compressed air is to be supplied. The head part 30F has the fuel supply port 30Fe and the air supply port 30Ea provided in parallel with each other.

Also, the head part 30F has the air stirring part 33 configured to stir the compressed air that is to be supplied from the air supply port 30Ea. The air stirring part 33 is fixed to the top surface 30U by the screw 37EB at a side distant from the fuel supply port 30Fe.

The air stirring part 33 has such a shape that it is curved in a direction in which an interval from the top surface 30U increases from the side fixed to the top surface 30U toward the tip end-side facing the air supply port 30Ea, and the part between the tip end-side of the air stirring part 33 and the air supply port 30Ea is opened toward the fuel supply port 30Fe. Also, one side part of the air stirring part 33, which faces the inner peripheral surface of the combustion chamber 3, has a circular arc shape conforming to the inner peripheral surface of the combustion chamber 3.

Thereby, the air stirring part 33 stirs the compressed air supplied from the air supply port 30Ea and generates a flow of the air to rotate with swirling in a spiral shape along the inner peripheral surface of the combustion chamber 3. Also, the part between the tip end-side of the air stirring part 33 and the air supply port 30Ea is opened toward the fuel supply port 30Fe, so that the compressed air supplied from the air supply port 30Ea flows toward the fuel supply port 30Fe.

Therefore, the compressed air is widely spread to involve the fuel supplied into the combustion chamber 3 over the entire combustion chamber 3, the mixing of the fuel and the compressed air is promoted and a distribution of the mixed gas is suppressed from being inclined to one side in the combustion chamber 3, so that it is possible to improve the combustion efficiency.

Figure 19:
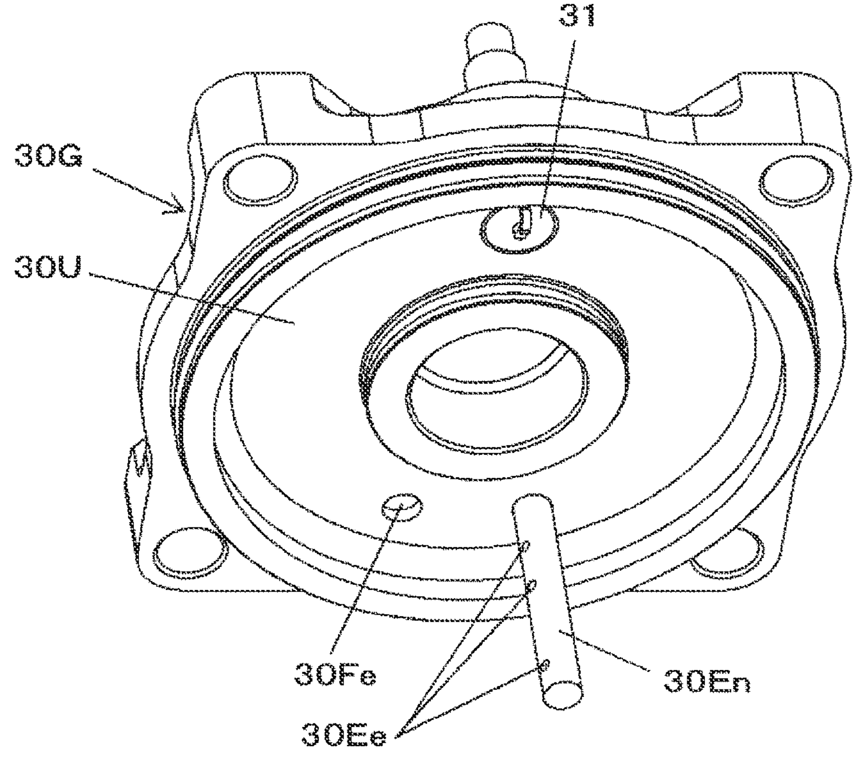
FIG. 19 is a perspective view depicting a seventh embodiment of the head part.

FIG. 19 is a perspective view depicting a seventh embodiment of the head part. A head part 30G is provided with the ignition device 31. Also, the head part 30G is provided with the fuel supply port 30Fe to which the fuel is to be supplied and an air supply port nozzle 30En to which the compressed air is to be supplied. The head part 30G has the fuel supply port 30Fe and the air supply port nozzle 30En provided in parallel with each other.

The air supply port nozzle 30En is an example of the stirring part, wherein a cylindrical member is erected from an air supply port (not shown) and at least one supply port 30Ee is provided on a circumferential surface. The air supply port nozzle 30En is provided so that the supply port 30Ee is to face toward the fuel supply port 30Fe.

Thereby, the compressed air supplied from the supply port 30Ee of the air supply port nozzle 30En flows toward the fuel supply port 30Fe and rotates with swirling along the inner peripheral surface of the combustion chamber 3.

Therefore, the compressed air is widely spread over the entire combustion chamber 3, the mixing of the fuel and the compressed air is promoted and a distribution of the mixed gas is suppressed from being inclined to one side in the combustion chamber 3, so that it is possible to improve the combustion efficiency. In the meantime, the respective embodiment may be combined. For example, the second embodiment shown in FIG. 14 where the fuel-side lead valve 30FB is provided with the urging member 39FB may be provided with the shield part 33C of the third embodiment shown in FIG. 15. Also, the air-side lead valve 30EB and fuel-side lead valve 30FB are provided to the top surface 30U as the inner wall surface of the combustion chamber 3 but may be provided on an inner surface as the inner wall surface of the combustion chamber 3. Also, in the embodiments, the air is used as the oxidant, and the mixed gas of the compressed air as the compressed oxidant and the fuel is used for actuation. However, the oxidant is not limited to the compressed air and the other oxidants may be used inasmuch as the oxidant contains oxygen necessary for combustion of the fuel. For example, oxygen, ozone, nitrogen monoxide and the like may also be used, instead of the air.

1A . . . nailing machine, 10 . . . main body part, 11 . . . handle part, 12 . . . nose part, 13 . . . tank mounting part, 14 . . . magazine, 15 . . . air plug, 16 . . . operation trigger, 17 . . . battery, 18 . . . battery mounting part, 2 . . . striking cylinder (striking mechanism), 20 . . . driver, 21 . . . piston, 22 . . . buffer material, 3 . . . combustion chamber, 30 . . . head part, 31 . . . ignition device, 4 . . . head valve (valve member), 40 . . . valve surface, 41 . . . first seal part, 41*a* . . . first seal material, 42 . . . second seal part, 42*a* . . . second seal material, 43 . . . actuation surface, 44 . . . spring, 45 . . . concave part, 5 . . . valve support member, 50 . . . partitioning part, 51 . . . striking cylinder inlet (striking mechanism inlet), 52 . . . actuation space, 53 . . . head valve inlet (valve member inlet), 54 . . . buffer material, 6 . . . blowback chamber, 60 . . . inlet/outlet, 8 . . . contact member, 80 . . . spring, 81 . . . link

The invention claimed is:

1. A driving tool comprising:

a striking mechanism configured to be actuated by a combustion pressure of a mixed gas of compressed air and fuel;

a combustion chamber in which the mixed gas of compressed air and fuel is to be combusted; and a valve member configured to be actuated by pressure variation of the combustion chamber, and to open and close communication between the striking mechanism and the combustion chamber, the valve member including a valve member cylinder, wherein the combustion chamber is provided around the valve member, wherein the valve member includes a valve surface at a lower end face in an axial direction of the valve member cylinder, and a largest diameter of the valve surface is smaller than a largest diameter of the striking mechanism, and wherein the striking mechanism includes an inlet connecting the combustion chamber and the striking mechanism, the inlet comprising an opening extending in an axial direction of the striking mechanism, and wherein the largest diameter of the valve surface is larger than a largest diameter of the inlet of the striking mechanism.

2. The driving tool according to claim 1, wherein the striking mechanism includes a striking cylinder, and the striking cylinder and the combustion chamber are partitioned by a partitioning part.

3. The driving tool according to claim 1, wherein the valve member includes a first seal and a second seal, and an actuation space is located between the first seal and the second seal.

4. A driving tool comprising:

a striking mechanism configured to be actuated by a combustion pressure of a mixed gas of compressed air and fuel;

a combustion chamber in which the mixed gas of compressed air and fuel is combusted; and a valve member which is actuated by pressure variation of the combustion chamber, and configured to open and close communication between the striking mechanism and the combustion chamber, wherein a valve support member is configured to support the valve member and has a diameter smaller than a diameter of the striking mechanism, and the valve support member is provided in the combustion chamber along an axial direction of the striking mechanism, wherein an actuation surface of the valve member is located radially inside the valve support member and the actuation surface of the valve member is located on an outer peripheral surface of the valve member, and wherein the actuation surface of the valve member is configured and arranged to receive combustion pressure from the combustion chamber.

5. The driving tool according to claim 1, wherein an urging member configured to urge the valve member is provided on an axis of the striking mechanism.

6. The driving tool according to claim 1, wherein the striking mechanism includes a striking cylinder and the largest diameter of the valve surface of the valve member is smaller than a largest diameter of the striking cylinder.

7. The driving tool according to claim 4, wherein the valve member slides inside of the valve support member.

8. The driving tool according to claim 4, wherein the valve member includes a first seal and a second seal, and an actuation space is located between the first seal and the second seal, and further wherein the actuation surface is formed on the second seal.

* * * * *